United States Patent
Fuji et al.

(10) Patent No.: US 7,672,221 B2
(45) Date of Patent: Mar. 2, 2010

(54) RADIO RECEIVER AND RADIO SIGNAL RECEIVING METHOD

(75) Inventors: Hiromasa Fuji, Yokosuka (JP); Hitoshi Yoshino, Yokosuka (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 904 days.

(21) Appl. No.: 11/452,412

(22) Filed: Jun. 14, 2006

(65) Prior Publication Data
US 2007/0002728 A1    Jan. 4, 2007

(30) Foreign Application Priority Data
Jun. 15, 2005   (JP) ............................. 2005-175781

(51) Int. Cl.
*H04J 11/00* (2006.01)
(52) U.S. Cl. .................. 370/210; 370/206; 370/208; 375/240.17
(58) Field of Classification Search ................ 370/203, 370/206–210; 375/240.17
See application file for complete search history.

(56) References Cited

U.S. PATENT DOCUMENTS

| | | | | |
|---|---|---|---|---|
| 6,463,261 | B1 * | 10/2002 | Hiramatsu et al. ......... | 455/63.1 |
| 2005/0157801 | A1 * | 7/2005 | Gore et al. ................. | 375/260 |
| 2006/0018411 | A1 * | 1/2006 | Gore et al. ................. | 375/340 |

FOREIGN PATENT DOCUMENTS

| | | |
|---|---|---|
| CN | 1242895 A | 1/2000 |
| JP | 10-190562 | 7/1998 |
| JP | 2004-297756 | 10/2004 |
| WO | WO 98/59450 | 12/1998 |
| WO | WO 2005/006586 A2 | 1/2005 |

OTHER PUBLICATIONS

Taiwen Tang, et al., "A Joint MIMO-OFDM Transceiver and MAC Design for Mobile Ad Hoc Networking", 2004 International Workshop on Wireless Ad-Hoc Networks, XP-010846731, May 31, 2004, pp. 315-319.
Hiromasa Fujii, et al., "Turbo receiver with SC/Simplified-MMSE (S-MMSE) type equalizer for MIMO channel signal transmission", 2003 IEEE 58th Vehicular Technology Conference VTC, Fall, 2003, pp. 632-636.

* cited by examiner

*Primary Examiner*—Jason E Mattis
*Assistant Examiner*—Kibrom T Hailu
(74) *Attorney, Agent, or Firm*—Oblon, Spivak, McClelland, Maier & Neustadt, L.L.P.

(57) ABSTRACT

An OFDM receiver includes a timing error detection unit that determines error information based on a difference between receiving timing of a desired signal from a counterpart transmitter and receiving timing of an undesired signal from a non-counterpart transmitter. The timing error detection unit includes a pilot signal detection unit configured to detect a pilot signal of the desired signal and a pilot signal of the undesired signal from an FFT-processed received signal; a first converting unit configured to convert a frequency-domain channel estimate derived from the pilot signal of the desired signal to a first time-domain channel impulse response; a second converting unit configured to convert a frequency-domain channel estimate derived from the pilot signal of the undesired signal to a second time-domain channel impulse response; and an error information determination unit configured to determine the error information based on the first and second channel impulse responses.

11 Claims, 33 Drawing Sheets

FIG.31
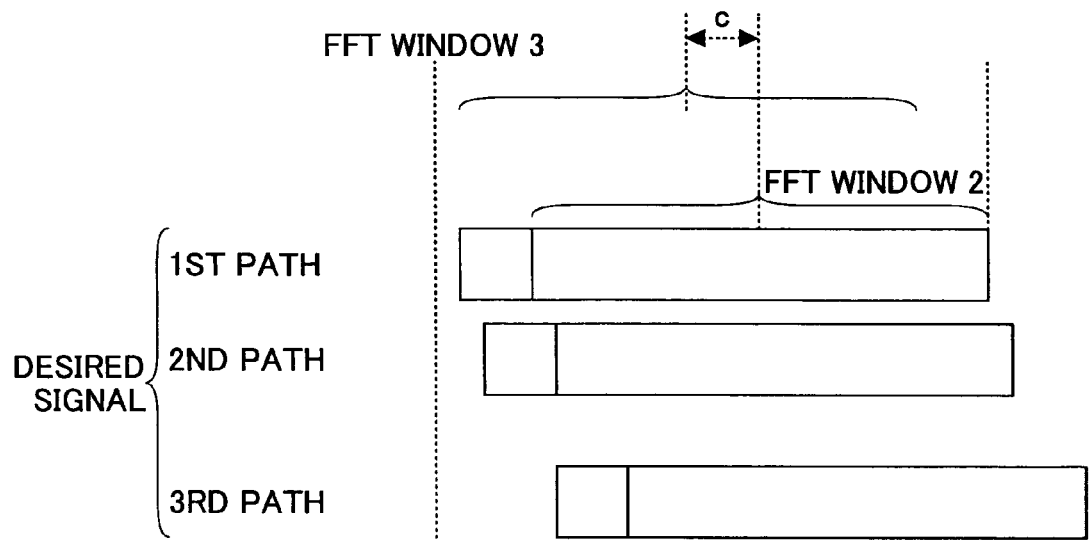
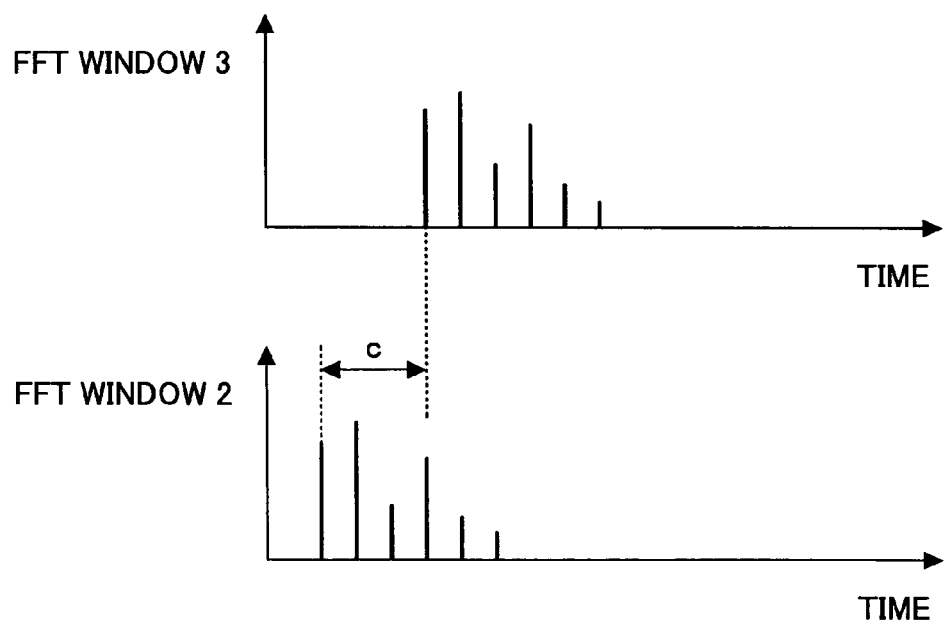

RADIO RECEIVER AND RADIO SIGNAL RECEIVING METHOD

FIELD OF THE INVENTION

The present invention generally relates to a wireless communication technique, and more particularly to an OFDM radio receiver and radio signal receiving method used in a mobile communication system allowing multiple mobile devices to perform radio communications in sync with each other using the same frequency band.

BACKGROUND OF THE INVENTION

Carrier sense multiple access with collision avoidance (CSMA/CA) is a known network control protocol, in which a carrier sensing scheme is used to allow multiple radio transceivers to share the same frequency band for radio communications under collision avoidance control, and it may be applied to wireless LANs (local area networks). With CSMA/CA, a transceiver performs carrier sensing prior to data transmission in order to determine whether there is another user carrying out radio communication. The transceiver can start transmitting data packets only if no users are sensed. Presence or absence of other users can be determined by, for example, measuring an interference level in the environment. If there is another user detected, data transmission is retried after a random period of time.

FIG. 1 is a schematic diagram illustrating a typical CSMA/CA transceiver, in which an interference level is measured at a received signal power level measuring unit to determine availability of a data transmission channel. Since with CSMA/CA a user cannot start transmission when another user is communicating, unacceptable delay may be produced in real-time communications and streaming transmission. In addition, as the number of users increases, communication may be restricted for a long period of time depending on the user environment.

Meanwhile, a technique for spatially multiplexing independent signals on the transmission side and separating the signals from each other by making use of channel differences on the receiving side is proposed. See, for example, Hiromasa Fujii, et al., "A Turbo Equalizer with Simplified MMSE Filtering for MIMO Channel Signal Transmission", 2003 IEEE 58$^{th}$ Vehicular Technology Conference VTC, fall, 2003. This technique allows multiple transceivers to carry out radio communications at the same time. The two transceivers communicating with each other are obviously in sync with each other; however, the transceivers communicating parallel to each other may be out of synchronization, as illustrated in FIG. 2. When multiple transceivers perform radio communication at asynchronous timing, detection accuracy of pilot symbols (or channels) from the respective transceivers and channel estimation accuracy are degraded. To this end, it is desired for communication pairs A-A' and B-B' to perform synchronous transmission, as illustrated in FIG. 3. In addition, when communication group 1 including the communication pair A-A' is approaching close to or merging with another communication group 2 including communication pair C-C', it is desired that all the communication pairs in the communication groups 1 and 2 be in sync with each other. Bringing all the transceivers to operate in sync with each other can improve the accuracy in signal detection from a spatially multiplexed signal, as well as increase the system capacity. In order to maintain appropriate synchronization, it is necessary to measure signal receiving timing (to be more precise, the difference between receiving timings of a desired signal and an undesired signal) precisely.

To bring multiple transceivers to operate in sync with each other, the global positioning system (GPS) may be used, or alternatively, a synchronizing signal (such as a beacon) may be transmitted from prescribed communication equipment. However, using GPS is disadvantageous indoors or when not in line-of-sight, and using a synchronizing signal requires additional expense. With the latter method, synchronization cannot be assured if the transceivers are out of the service area.

Another publication, JP 10-190562A, employs a structure shown in FIG. 4, in which a reference base station A is determined in advance, and other base stations B and C are in sync with the reference base station A to control the transmission timing of each of the transceivers. Still another publication, JP 2004-297756A, discloses a transmission timing control technique in code division multiple access (CDMA), in which mobile stations located under a base station communicate with each other in sync with the base station. With these methods, however, counterpart transceivers (or mobile stations) with which a certain transceiver is going to communicate are restricted by the base-station configurations, and accordingly, they cannot be applied as they are to an adhoc network. In addition, it is difficult in reality in a rapidly changing environment to select and fix a base station most suitable for the reference base station in advance from among many base stations.

Under the multi-path environment, many delayed waves arrive from various angles through different propagation paths from a transmitter to a receiver. A set of delayed waves are measured at the receiver as channel impulse response. Ideally, a certain correlation value appears like a delta function at each of the path timings, while the value in a no-path section becomes zero.

However, if autocorrelation of a currently detected pilot signal is imperfect, the level of the no-path section does not become zero, and it is detected as a signal of a certain level. An undesirable signal component is also contained in the measured channel impulse response due to imperfection in orthogonality between pilot signals. These undesirable facts prevent accurate measurement of the receiving timing of each path.

SUMMARY OF THE INVENTION

To overcome at least one of the above-described problems, embodiments of the present invention provide a radio receiver and a signal receiving method of an orthogonal frequency division multiplexing (OFDM) scheme that can accurately measure the receiving timing difference between a desired signal and an undesired signal even under the multipath environment.

In one aspect of the invention, an OFDM receiver used in a communication system in which multiple radio communication apparatuses communicate in sync with each other using the same frequency band is provided. The receiver comprises:

(a) an initial timing setting unit configured to define an FFT window for performing fast Fourier transform on a received signal;

(b) an FFT unit configured to perform fast Fourier transform on the received signal according to the FFT window; and (c) a timing error detection unit configured to determine error information based on a difference between receiving timing of a desired signal from a counterpart transmitter and receiving timing of an undesired signal from a non-counterpart transmitter. The timing error detection unit includes:

a pilot signal detection unit configured to detect a pilot signal of the desired signal and a pilot signal of the undesired signal from the FFT-processed received signal;

a first converting unit configured to convert a frequency-domain channel estimate derived from the pilot signal of the desired signal to a first time-domain channel impulse response;

a second converting unit configured to convert a frequency-domain channel estimate derived from the pilot signal of the undesired signal to a second time-domain channel impulse response; and an error information determination unit configured to determine the error information based on the first and second channel impulse responses.

With this structure, a timing difference between a desired signal reception and an undesired signal reception can be determined accurately even under the multipath environment.

BRIEF DESCRIPTION OF THE DRAWINGS

Other features and advantages of the invention will become more apparent from the following detailed description when read in conjunction with the accompanying drawings, in which

FIG. 31 is a schematic diagram illustrating the relationship between the FFT window and the amount of shift along the time axis;

DETAILED DESCRIPTION OF THE PREFERRED EMBODIMENT

Figure 1:
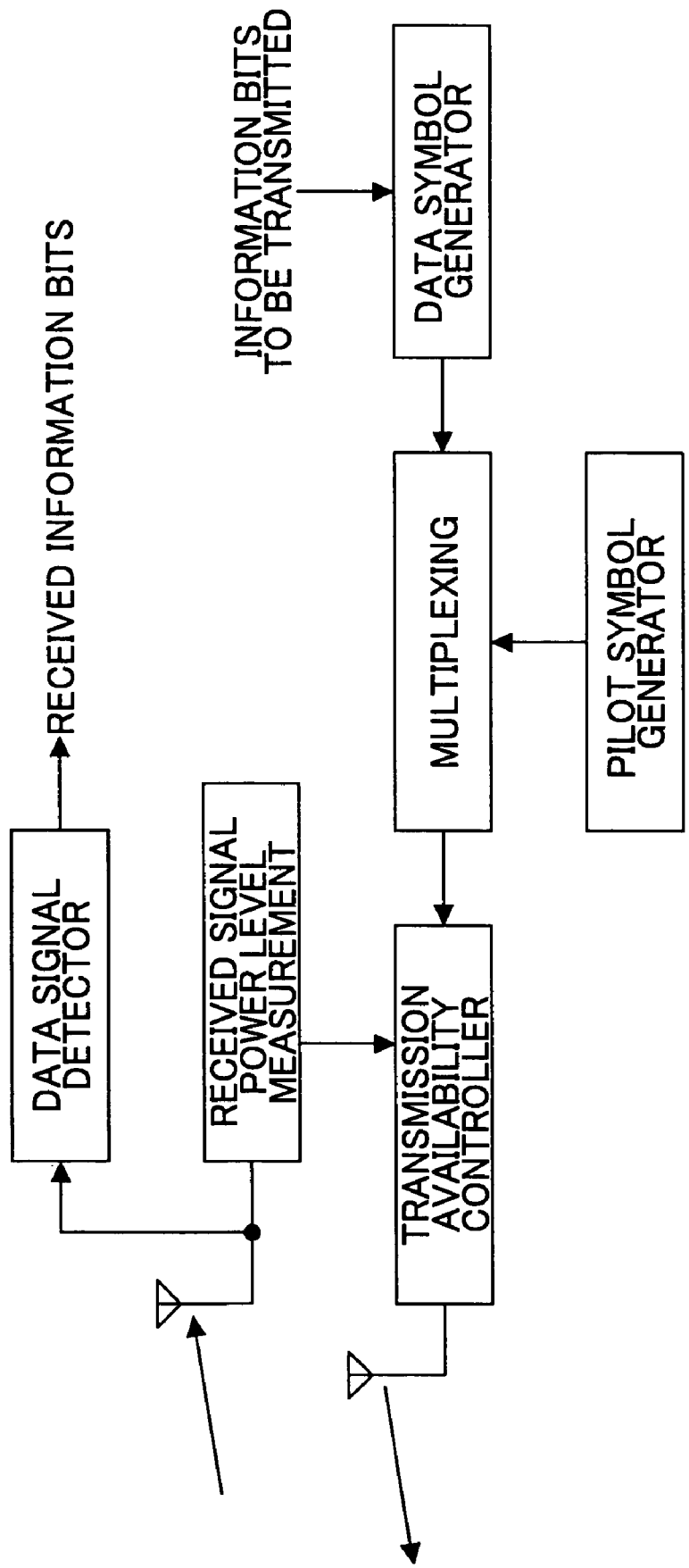
FIG. 1 is a schematic block diagram of a conventional radio transceiver.
Figure 2:
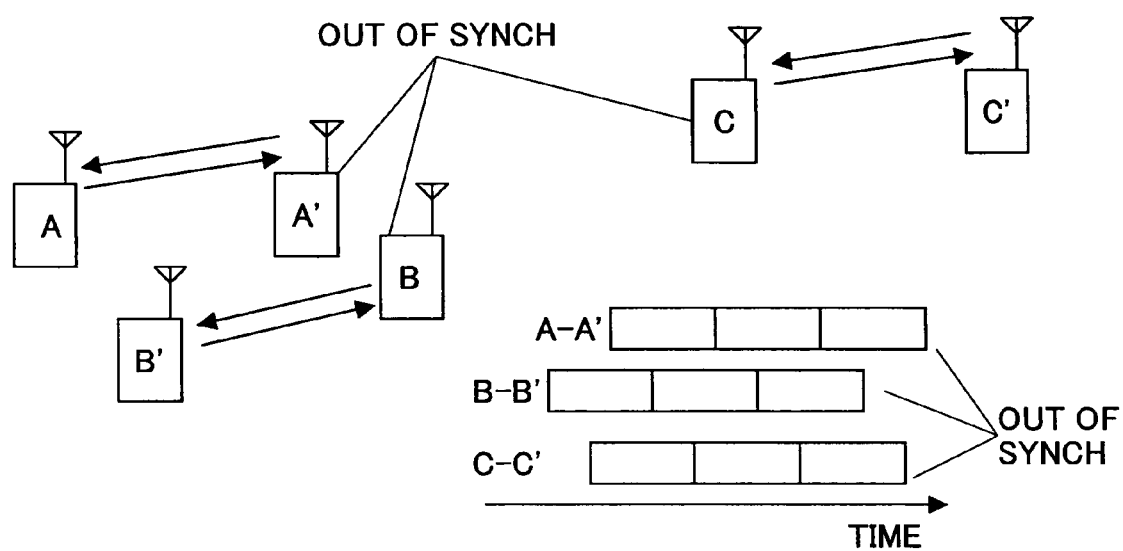
FIG. 2 is a schematic diagram illustrating multiple transceiver pairs simultaneously communicating with each other.
Figure 3:
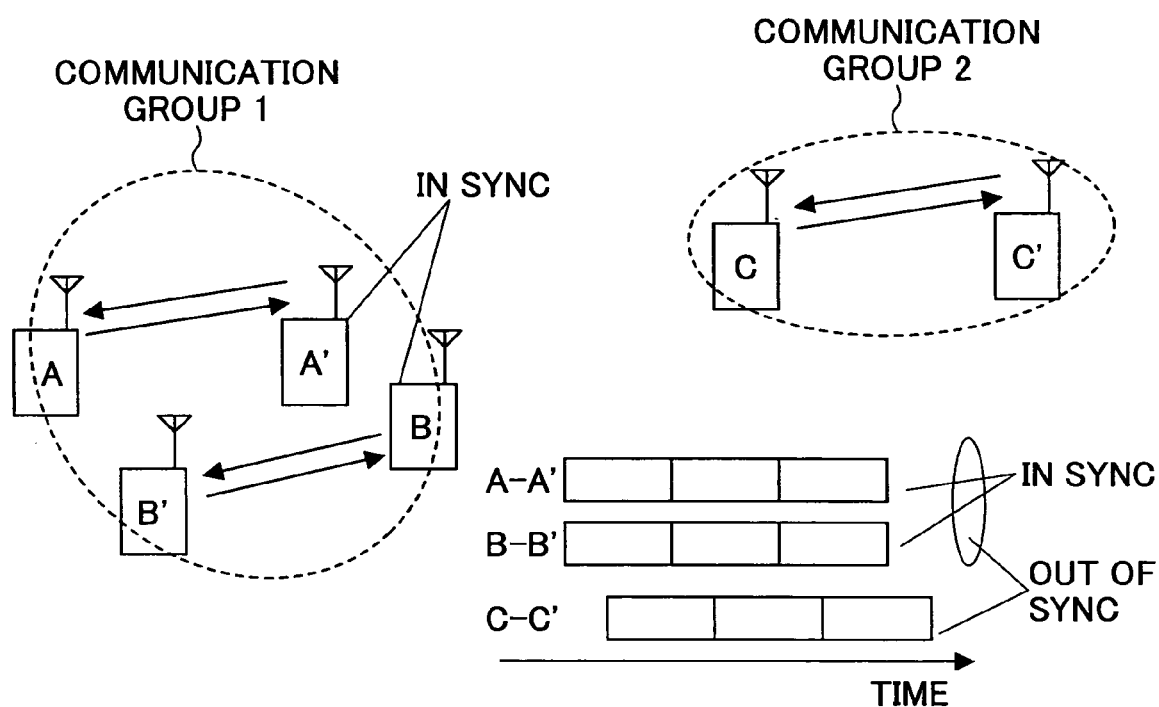
FIG. 3 is another example in which multiple transceiver pairs are communicating with each other.
Figure 4:
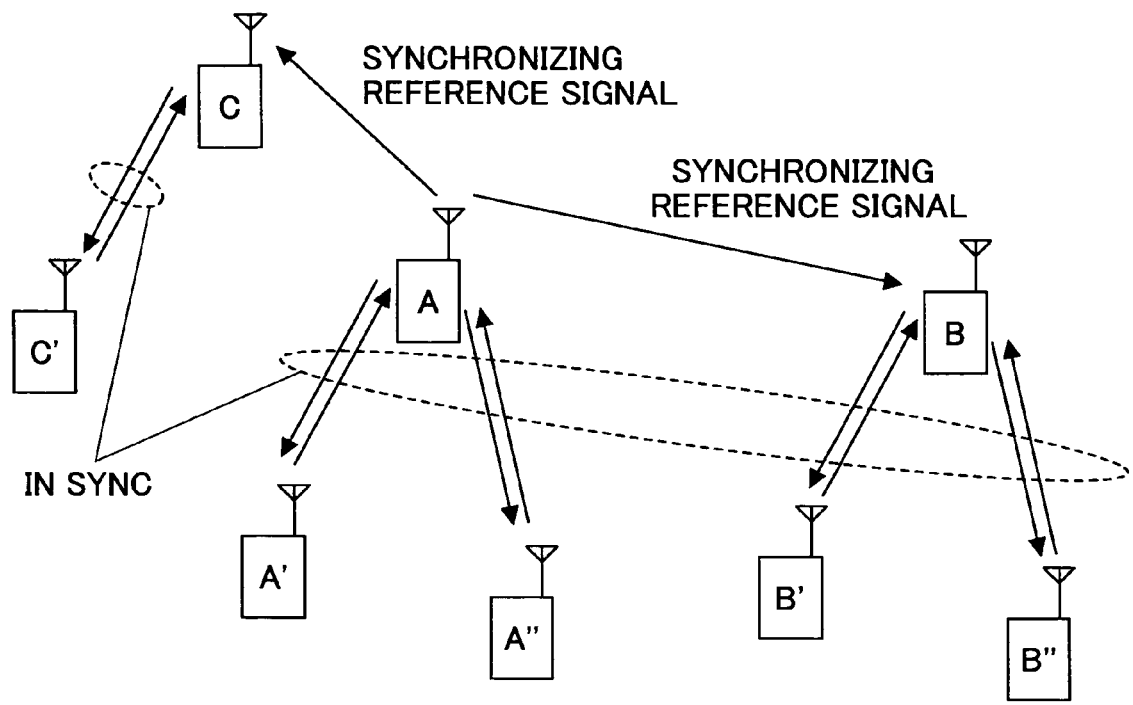
FIG. 4 illustrates a known technique in which transceivers belonging to respective base stations communicate in sync with each other based on synchronizing reference signals.
Figure 5:
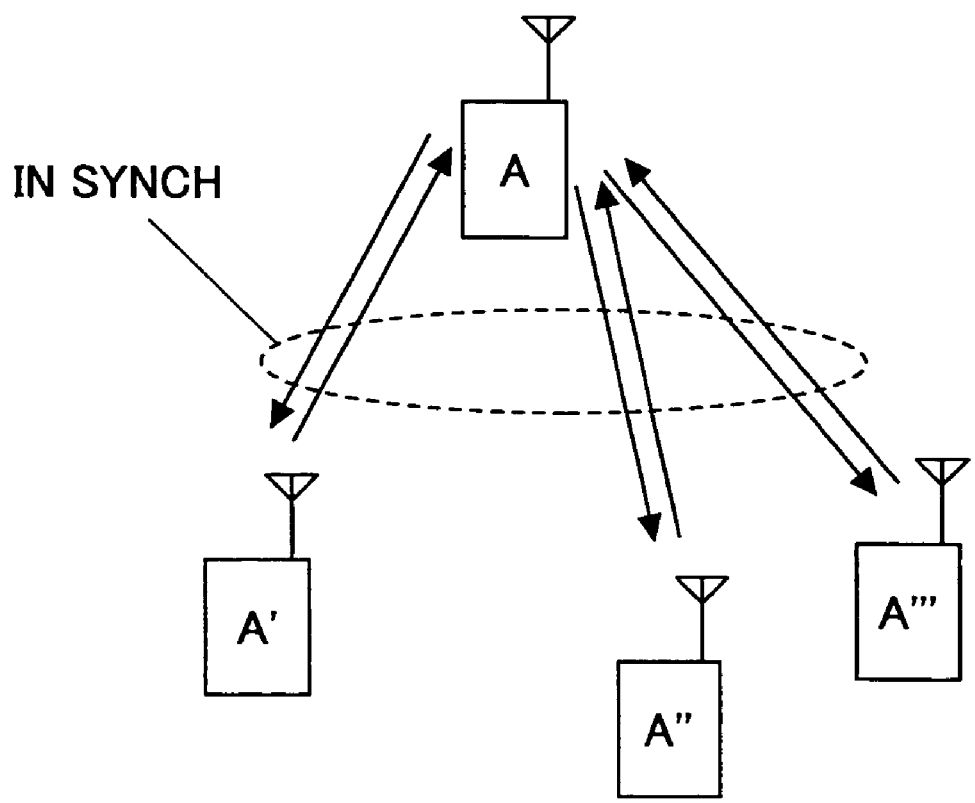
FIG. 5 illustrates an example of synchronous communications between a base station and mobile stations located under this base station.

Prior to describing the preferred embodiments of the invention, explanation is made of the outline of a communication system to which the present invention is applied. In the communication system, multiple communication apparatuses or transceivers (which are referred to as "mobile terminals" in the embodiments) communicate in sync with each other in the same frequency band. The receiver of a transceiver produces a time-domain impulse response for each of a desired signal and an undesired signal based on the corresponding channel estimate of the desired or undesired signal measured in the frequency domain. The receiver then determines the difference between receiving timings derived from the impulse responses of the desired and undesired signals to obtain accurate timing information (error information) as to the desired signal and undesired signal. The accurately estimated timing difference between the receiving timing of the desired signal transmitted from a counterpart transceiver being in communication and receiving timing of the undesired signal from a non-counterpart (non-connected) transceiver. The detected error information is reported to the counterpart transceiver.

Two or more frequency-domain channel estimates derived from two or more undesired signals may be combined into a signal channel estimate of the frequency domain. The combined frequency-domain channel estimate is converted to a time-domain channel impulse response. This arrangement can reduce the number of IFFT units or the number of arithmetic operations in the receiver.

In the communication system, a frequency band may be divided into multiple frequency blocks. Each of the frequency blocks includes one or more subcarriers. In this case, the timing error detection unit may derive not only the receiving timing of an undesired signal using the frequency block currently used by the desired signal, but also receiving timing of an undesired signal using a different frequency block. Such a different frequency block is, for example, an adjacent frequency block.

The receiving timing of an undesired signal sharing the frequency block with the desired signal and the receiving timing of an undesired signal using a different frequency block may be weighted and combined. With this arrangement, receiving timing can be measured according to the contribution of interference levels with respect to the desired signal.

In a preferred example, an FFT window is set by an initial timing setting unit. Such an FFT window has a starting point after the appearance of the maximum-level delayed wave and an end point before the termination of the first-arriving wave within the range not beyond the guard interval from the first-arriving wave. This arrangement can maximize the number of symbols contained in the FFT window, and can contribute to improvement of accuracy in measurement of receiving timing.

Guard intervals of different lengths may be used for data symbols and pilot symbols. In this case, different FFT windows may be established for the data symbols and the pilot symbols, respectively.

The phase of the channel impulse response derived from the pilot signal for the desired signal may be corrected according to the pilot symbol inserted position. The timing of the channel impulse response may be corrected according to the time difference between FFT windows having different starting points. Using an FFT output obtained at a certain timing of an FFT window, another FFT output may be estimated at a different FFT window timing. These arrangements can improve the arithmetic efficiency when different FFT windows are in use.

In a preferred example, a pilot symbol pattern determined for a single frequency block may be repeated as many times as the number of frequency blocks to be used when determining a pilot symbol pattern for multiple frequency blocks. With this arrangement, a frequency-domain channel estimate can be determined from an undesired signal in a simple manner regardless of the number of frequency blocks used by non-connected (non-counterpart) mobile terminals.

Multiple channel estimates for multiple frequency blocks may be collectively processed by inverse fast Fourier transform. In this case, it is determined by the comparing the time durations of the IFF transformed signals whether adjacent frequency blocks are used by a same mobile terminal. Alternatively, the continuity of frequency blocks may be determined without using IFFT. This can be done by, for example, extrapolating a frequency-domain channel estimate for one of the adjacent frequency bands and comparing the subcarrier components between before and after the extrapolation of the channel estimate.

Embodiment 1

Figure 6:
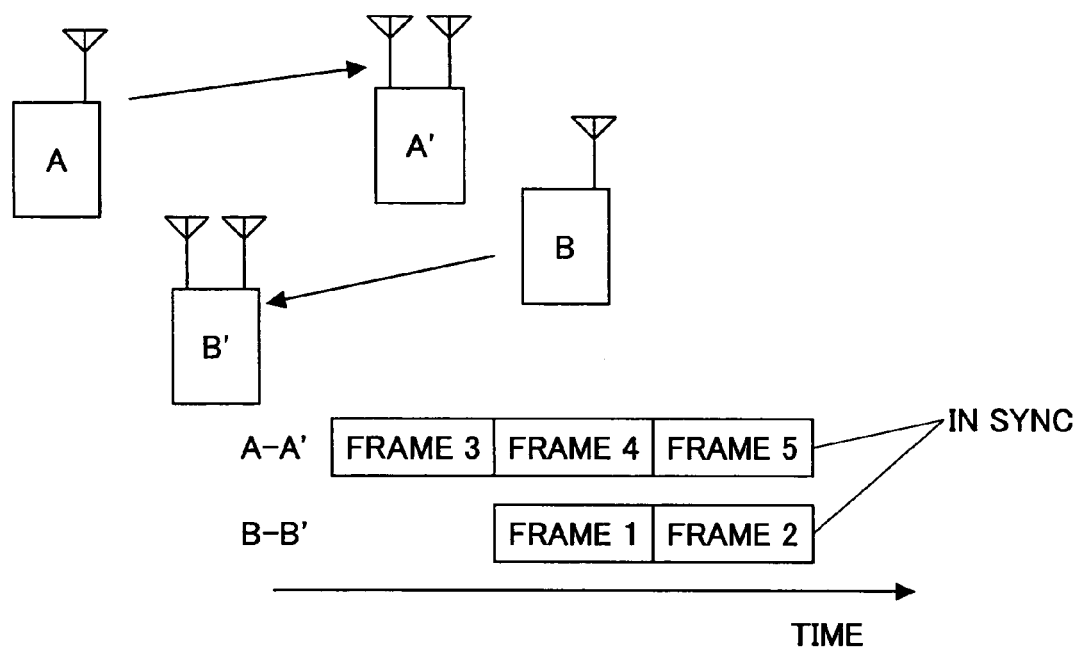
FIG. 6 illustrates an example of multiple transceiver pairs communicating in sync with each other.

FIG. 6 is a schematic diagram illustrating mobile terminal pairs A-A' and B-B' communicating in sync with each other in the same frequency band. The mobile terminals may be another type of radio communication apparatus. The mobile terminals A and B are operating under the resource allocation for symbols shown in FIG. 7. Pilot symbols and data symbols are time-multiplexed, while the pilot symbols of mobile terminal A and the pilot symbols of mobile terminal B are multiplexed alternately along the frequency axis. In the following, explanation is made of how mobile terminal A' currently communicating with mobile terminal A detects a timing difference between reception of a signal from mobile terminal (counterpart device) A and reception of a signal from mobile terminal (non-counterpart or non-connected device) B.

Figure 8:
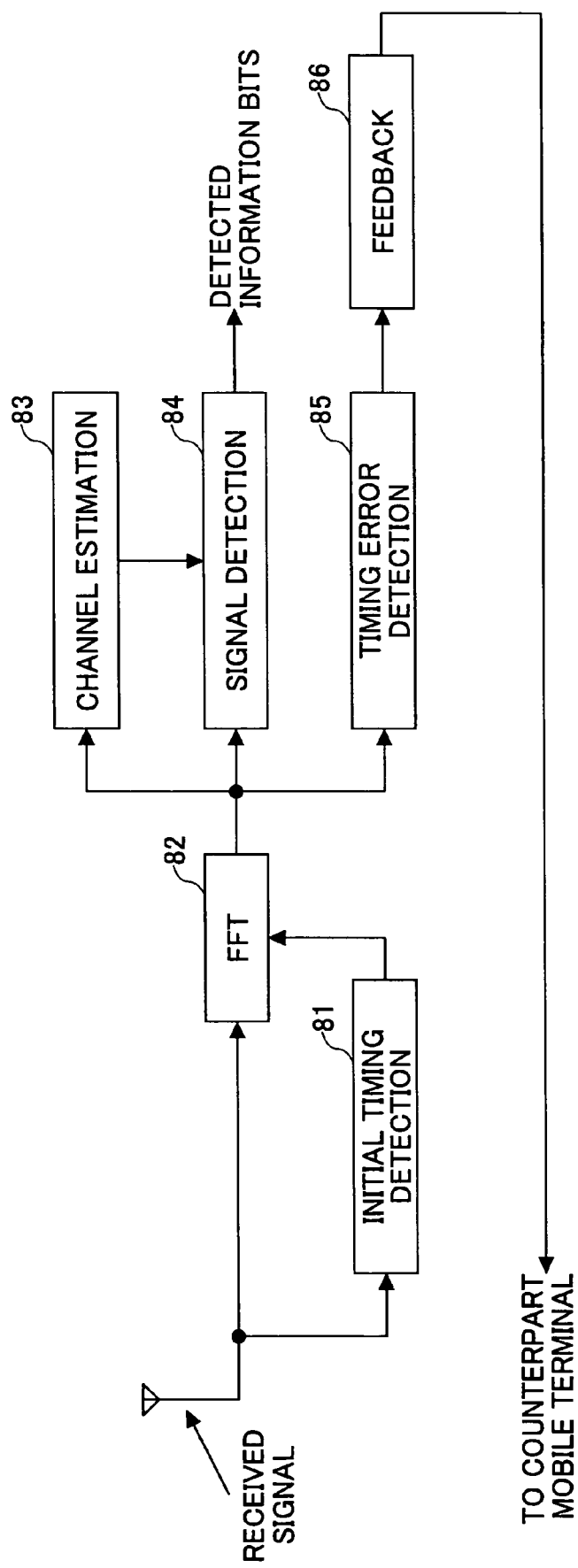
FIG. 8 is a schematic block diagram of a radio receiver serving as a part of a transceiver according to an embodiment of the invention.

FIG. 8 is a block diagram of a receiver of the mobile terminal A' employing an OFDM signal transmission/receiving scheme. The receiver includes an initial timing detection unit 81, an FFT unit 82, a channel estimation unit 83, a signal detection unit 84, a timing error detection nit 85, and a feedback unit 86.

The initial timing detection unit 81 determines the beginning (starting timing) of an FFT window, which timing is determined such that no signals other than the counterpart mobile terminal are received within the FFT window if only the counterpart mobile terminal exists in the ambient environment. In this case, for example, the timing at which the correlation level of the signal received from the counterpart mobile terminal first exceeds the threshold may be selected as the beginning of the FFT window. If there is a mobile terminal existing other than the counterpart mobile terminal in the environment, the beginning of the FFT window is determined according to the signal receiving timing from this non-counterpart mobile terminal.

The FFT unit 82 performs fast Fourier transform on the received signals at designated timing. Through the FFT, a series of time-domain received signals is converted to a set of frequency-domain signals for each of the subcarriers.

The channel estimation unit 83 calculates a channel estimate based on the FF transformed signals, and reports the estimation result to the signal detection unit 84.

The signal detection unit 84 adjusts the amplitude and the phase of the received signal based on the channel estimate, and outputs the adjusted signal for subsequent data detection. The received signal may contain not only a desired signal from the counterpart mobile terminal, but also an undesired signal or an interference signal from a non-counterpart mobile terminal. A counterpart mobile terminal is one to and from which information is transmitted. In the example shown in FIG. 6, the counterpart of mobile terminal A' is mobile terminal A, while mobile terminals B and B' are non-counterparts for the mobile terminal A'. Which transceiver is a counterpart is determined on a relative basis. Accordingly, a counterpart of transceiver B' is transceiver B, while transceivers A and A' are non-counterparts for transceiver B'. The signal detection unit 84 detects a desired signal and an undesired signal and appropriately extracts the desired signal using a known signal detection technique, such as maximum likelihood of detection (MLD) method available in MIMO multiplexing or a method using a linear filter.

The timing error detection unit 85 detects the timing difference between reception of the desired signal and reception of the undesired signal from the FF transformed signal.

Figure 7:
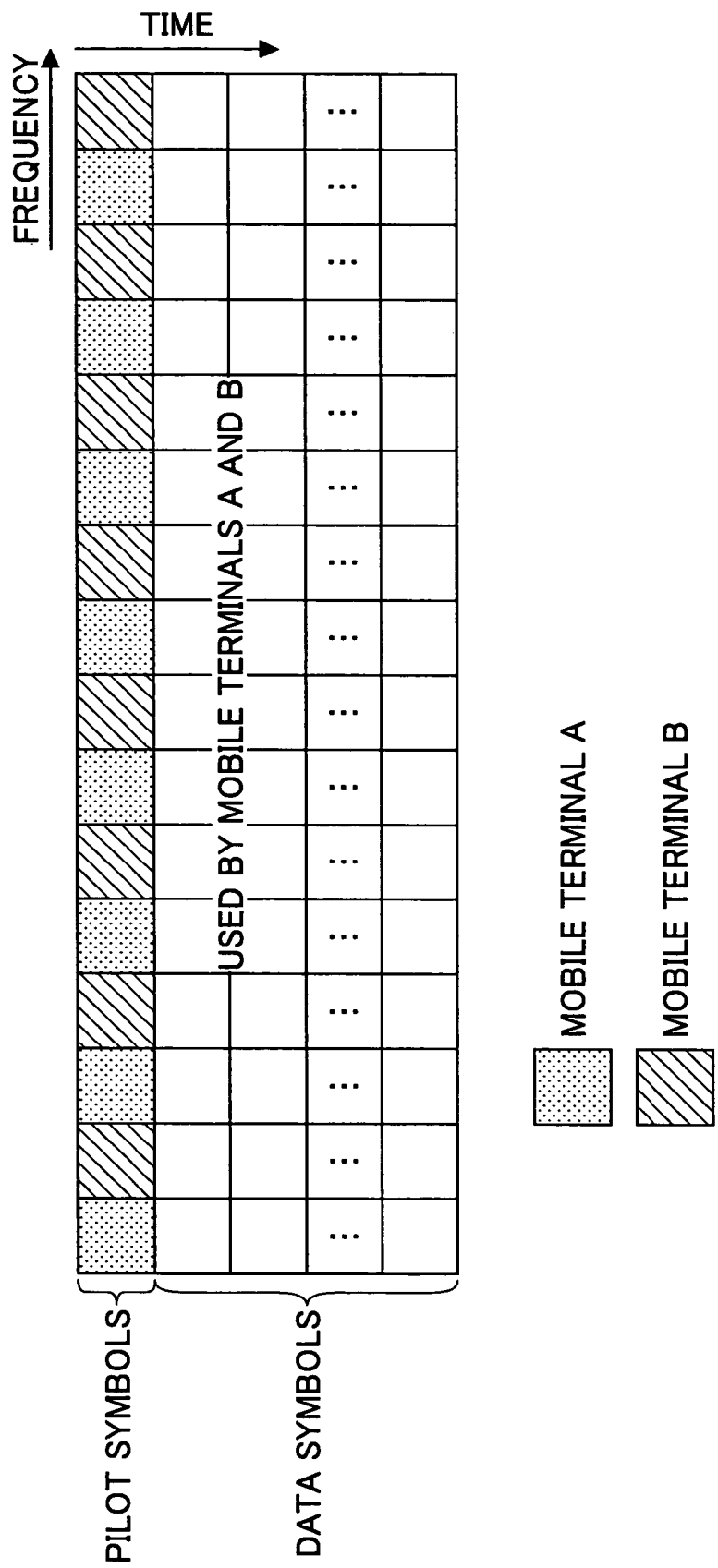
FIG. 7 illustrates an example of resource allocation for symbols.
Figure 9:
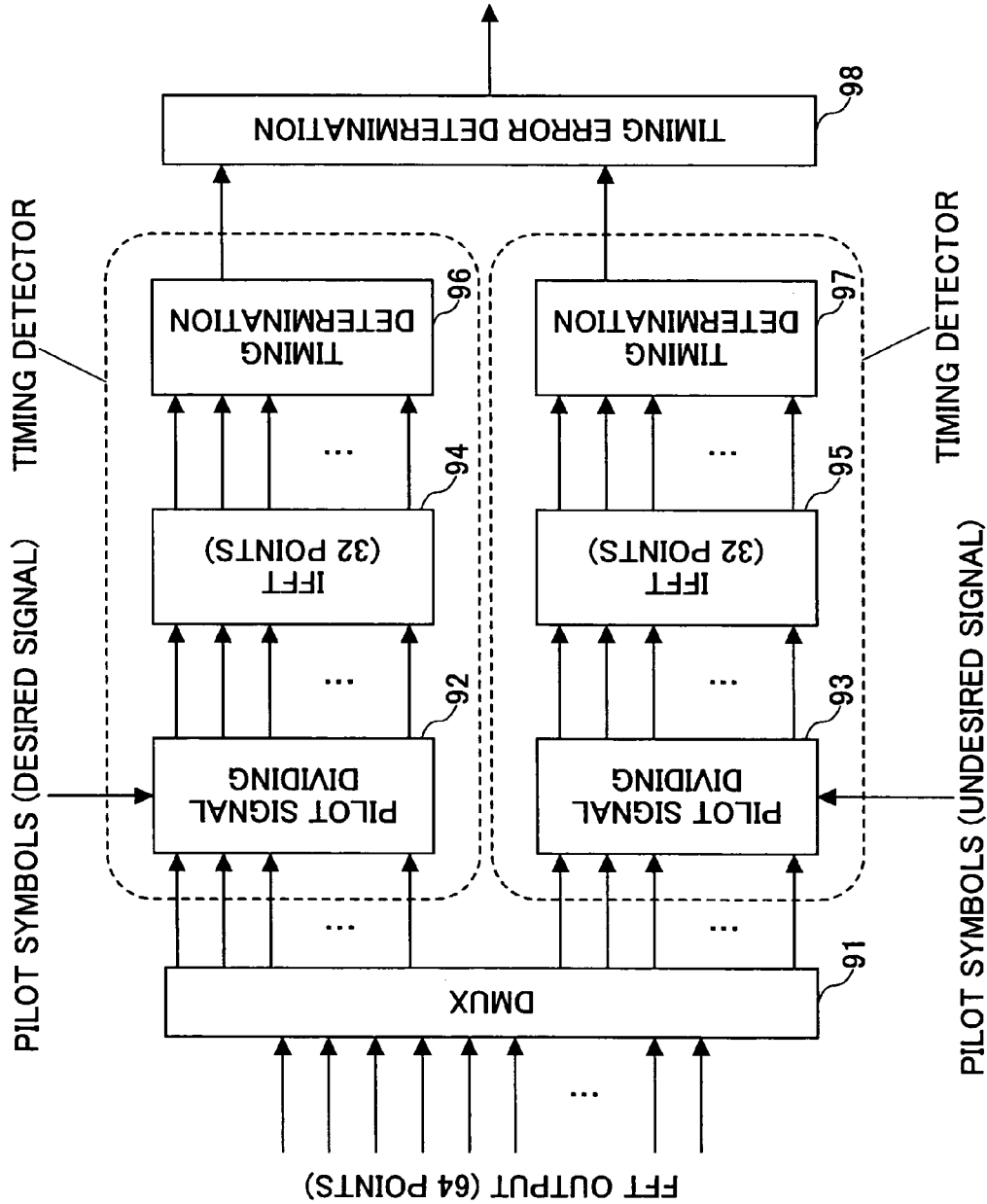
FIG. 9 is a schematic diagram of the timing error detection unit shown in FIG. 8.

FIG. 9 is a block diagram of the timing error detection unit 85. The timing error detection unit 85 includes a demultiplexer 91, two timing detector blocks (for the desired signal and the undesired signal) boxed by the dashed lines, and a timing error determination unit 98. The demultiplexer 91 separates the pilot symbols of user 1 (mobile terminal A, for example) and the pilot symbols of user 2 (mobile terminal B, for example) from the received signal. Because the pilot symbols are placed along the frequency axis under a certain rule, as illustrated in FIG. 7, the demultiplexer 91 can detect each of the received pilot symbols according to the rule. The resource allocation pattern for the pilot symbols is not necessarily an alternate pattern, and an arbitrary pattern known only at the transmitter and the receiver may be used. However, an alternate pattern is preferable from the viewpoint of ensuring similar characteristics for both mobile terminals.

Each of the pilot signal dividing units 92 and 93 divides the input signal by its own pilot signal to derive a channel estimate representing a degree of influence exerted through the wireless channel.

Each of the IFFT units 94 and 95 performs inverse fast Fourier transform on the derived channel estimate to determine an impulse response. Through the IFFT, the value expressed in the frequency domain and representing the influence introduced through the channel is converted to a time-domain expression.

Each of the timing determination units 96 and 97 determines and outputs a receiving timing of the associated input signal using the impulse response. The receiving timing is, for example, the first path timing indicated by the impulse response, or the center of all or a part of the set of paths.

The timing error determination unit 98 determines a difference between the receiving timings of the desired signal and the undesired signal. The difference is reported by the feedback unit 86 shown in FIG. 8 to the counterpart mobile terminal. If multiple OFDM symbols are used as the pilot symbols, a difference between the average receiving timing of the desired signal and the average receiving timing of the undesired signal may be determined. Alternatively, multiple differences may be determined and the average of the differences may be output. The averaging includes arithmetic averaging, as well as general weighted averaging.

Figure 10:
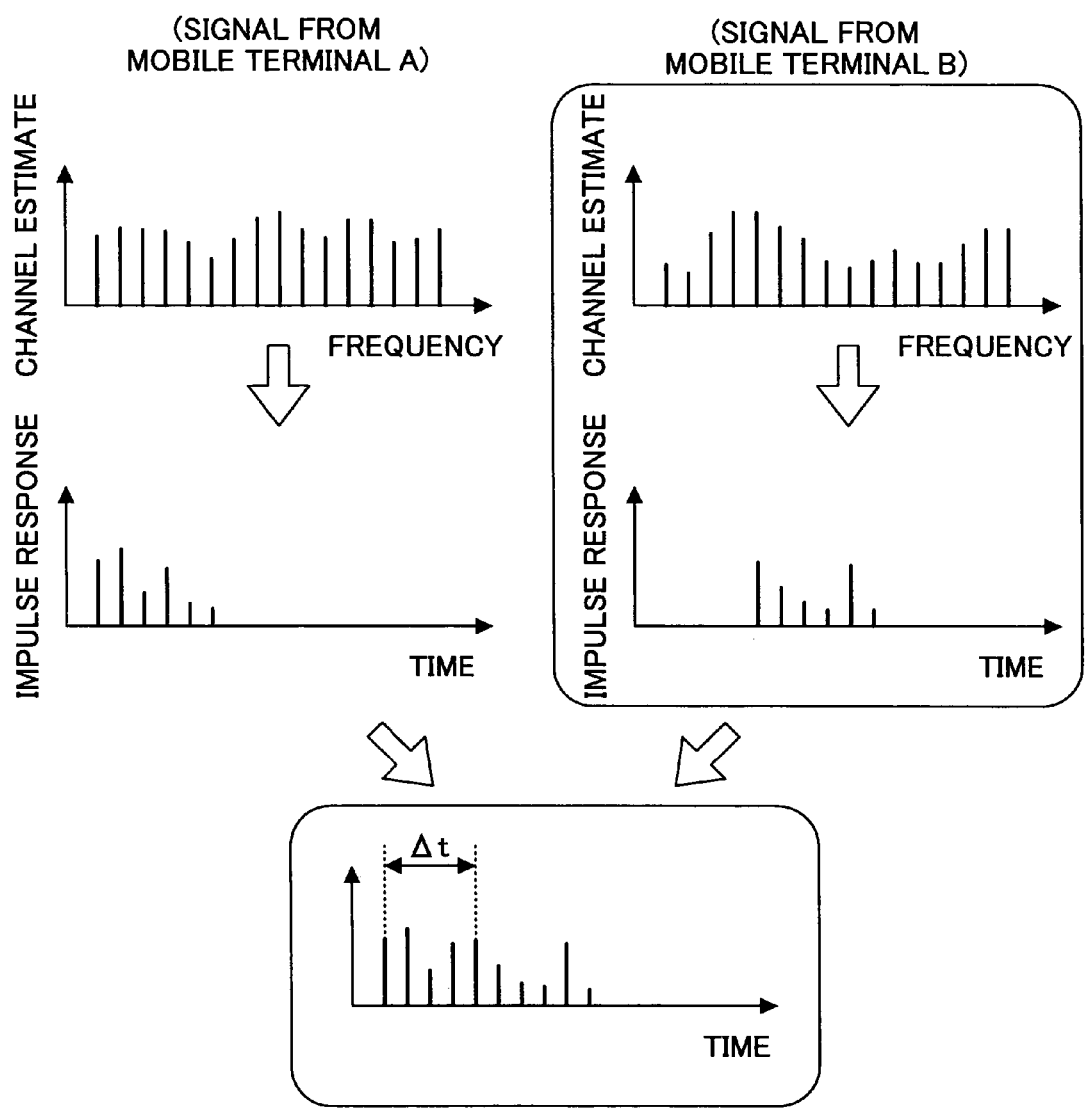
FIG. 10 is a schematic diagram used to explain the basic idea for detecting a receiving timing difference.

FIG. 10 illustrates how a receiving timing difference Δt is determined. In FIG. 10, the frequency-domain channel estimate and the time-domain impulse response for mobile terminal A correspond to the input and the output of the IFFT unit 94, respectively, shown in FIG. 9. Similarly, the frequency-domain channel estimate and the time-domain impulse response for mobile terminal B correspond to the input and output of the IFFT unit 95, respectively, shown in FIG. 9. In the example shown in FIG. 10, the receiving timing difference Δt is determined by calculating the time difference between the first paths of the impulse responses for mobile terminals A and B.

When mobile terminal A' is going to start communicating with mobile terminal A, the initial timing detection unit 81 of the mobile terminal A' defines an FFT window. If there is no other nearby communication device (non-counterpart mobile terminal) existing, mobile terminals A and A' can start communicating by themselves. If other mobile terminals B and B' are already in communication with each other, the mobile terminals A and A' have to be in sync with the pair of mobile terminals B and B', and therefore, the transmission timing is determined so as to be in sync with that of the mobile terminal pair B and B'. The signal being propagated contains both a desired signal component and an undesired signal component. Ideally speaking, these signal components are received simultaneously, and separated from each other in an appropriate manner. Since, however, the communication environment changes every moment, the receiving timings of the desired signal and the undesired signal may also change during communications.

The difference between the receiving timings of the desired signal and the undesired signal (which difference is referred to as "error information") is detected by the timing error detection unit 85, and reported to the counterpart mobile terminal A through the feedback unit 86. The counterpart mobile terminal A adjusts the signal transmission timing toward the mobile terminal A' based on the error information supplied from the mobile terminal A'. Consequently, timing of receiving the signal from mobile terminal A changes at mobile terminal A'. On the other hand, mobile terminals B and B' try to synchronize themselves with mobile terminal pair A and A', and behave in a similar manner. By causing each of the mobile terminal pairs to update the transmission timing so as to reduce the timing difference (represented by error information), multiple mobile terminals can communicate in sync with each other.

If multiple receiving antennas are used, the timing error (difference) may be determined based on the signals received at all the receiving antennas.

Concerning Fourier transform and inverse Fourier transform, discrete Fourier transform (DFT) and inverse discrete Fourier transform (IDFT) may be used in place of fast Fourier transform (FFT) and inverse fast Fourier transform (IFFT). Although the number of points of the IFFT units 94 and 95 is 32 in FIG. 9, other values may be taken depending on use. If the IFFT point number of the IFFT unit does not agree with the number of subcarriers, the IFFT unit has to use DFT with the data points consistent with the number of subcarriers.

Embodiment 2

Figure 11:
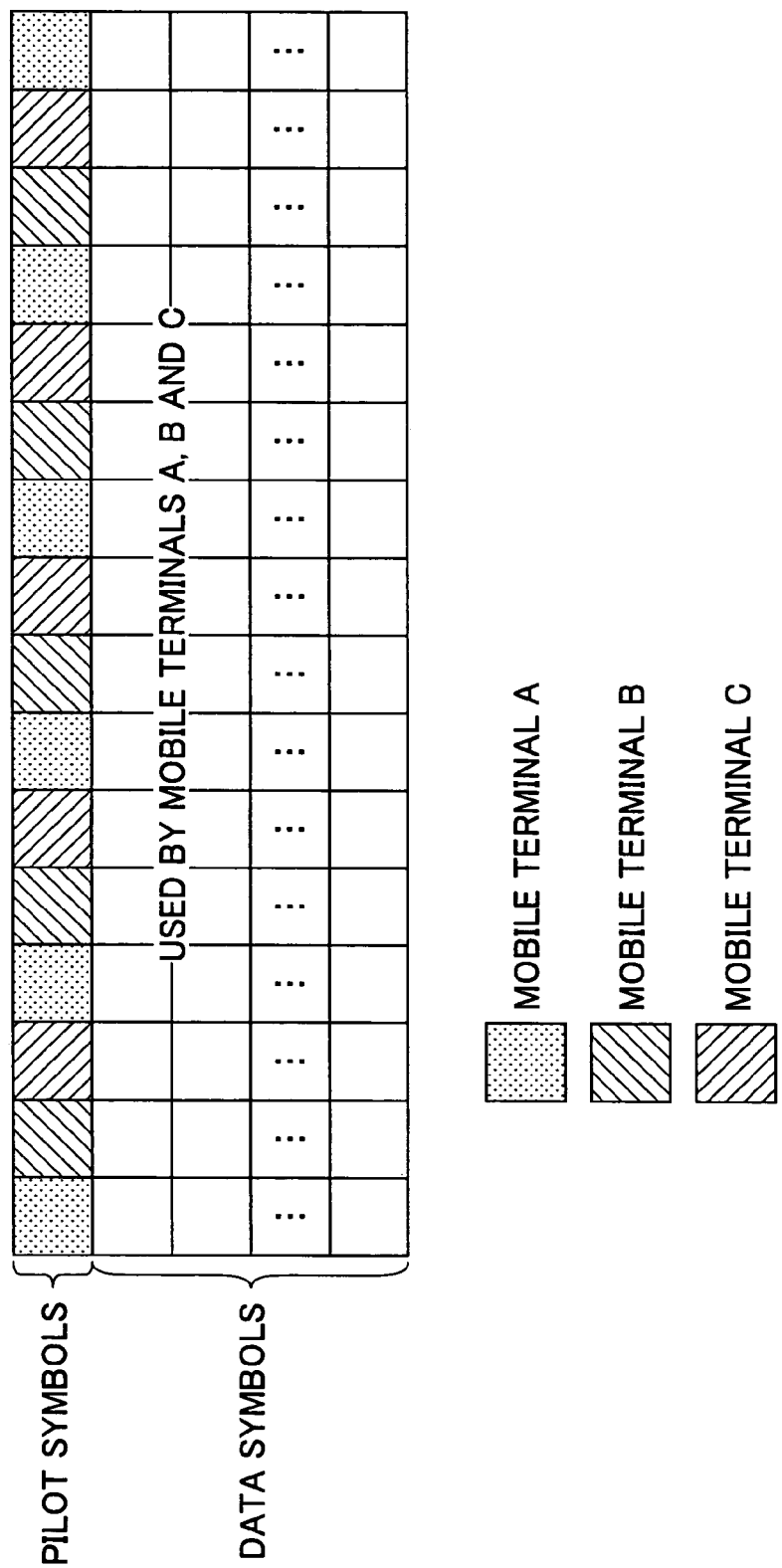
FIG. 11 illustrates an example of resource allocation for symbols when a frequency band is shared between three mobile terminals.

FIG. 11 is a schematic diagram illustrating resource allocation for symbols when the entire range of a frequency band is shared among three mobile terminals, unlike the previous embodiment shown in FIG. 7 in which two mobile terminals share the entirety of a frequency band. By determining an impulse response for each of the three mobile terminals, a receiving timing difference can be determined. In this case, however, IFFT operations at the timing error detection unit 85 are performed three times. In general, to determine impulse responses for N mobile terminals, N times IFFT operations have to be carried out.

Figure 12:
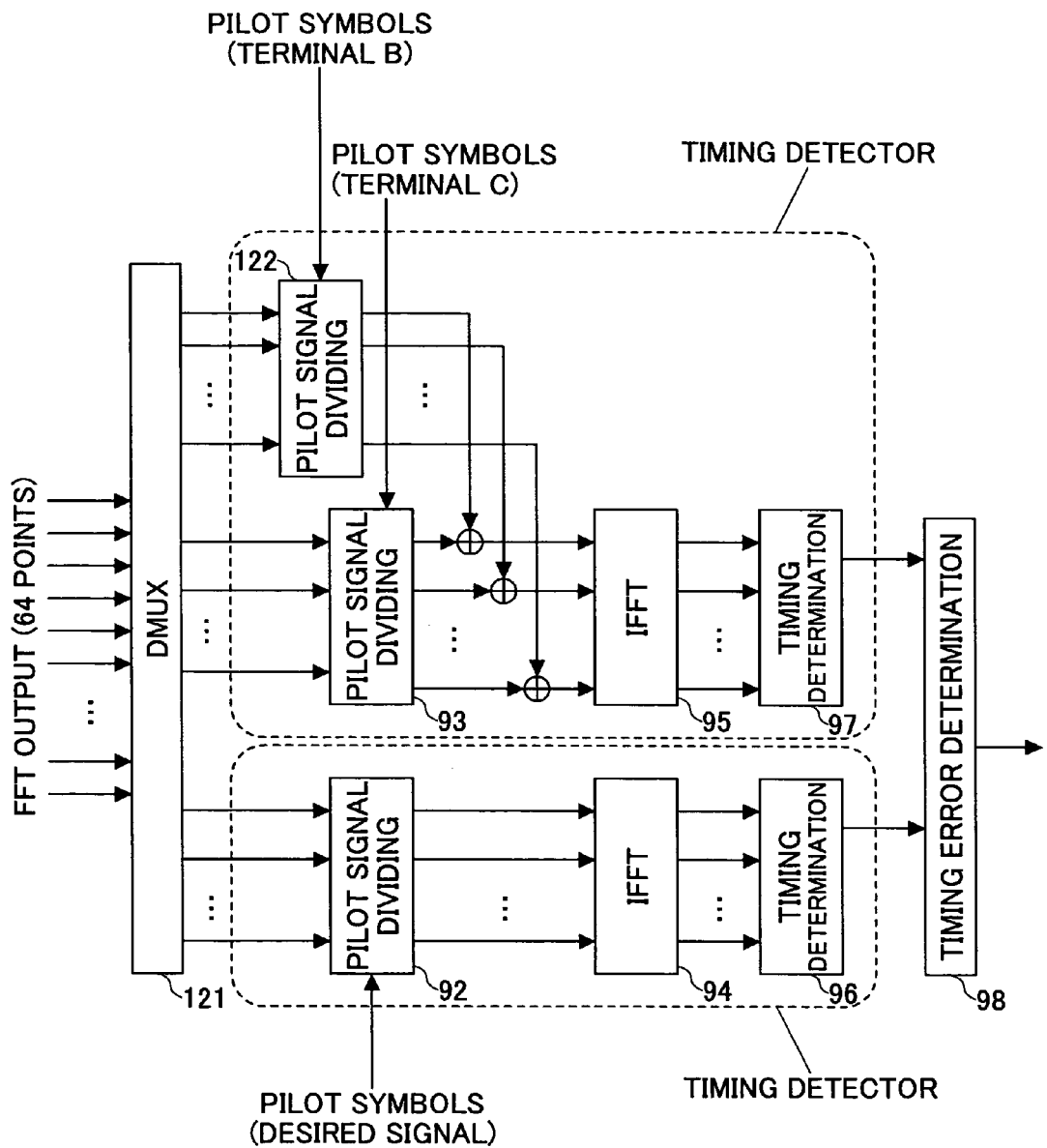
FIG. 12 is a schematic block diagram of the timing error detection unit according to another embodiment of the invention.

FIG. 12 is a block diagram of the timing error detection unit 85 suitable for the arrangement shown in FIG. 11. The components shown in FIG. 9 are denoted by the same symbols. Demultiplexer 121 detects each of the pilot symbols appropriately, just like demultiplexer 91. In this example, each of the three types of pilot symbols placed at certain intervals along the frequency axis is appropriately detected. The timing detector block including the pilot signal dividing unit 92, IFFT 94 and the timing determination unit 96 is a processing unit for the desired signal transmitted from the mobile terminal A. An additional pilot signal dividing unit 122 is provided. Each of the pilot signal dividing units 92, 93 and 122 has a same function, and divides the pilot symbols of the associated one of the mobile terminals A, B and C. The channel estimate of the desired signal output from the pilot signal dividing unit 92 is supplied as it is to the IFFT unit 94. The IFFT unit 94 outputs and supplies a time-domain impulse response of the desired signal to the timing error determination unit 98.

On the other hand, the channel estimates for the undesired signals output from the pilot signal dividing unit 93 and 121, respectively, are combined into a single value, and the combined estimate is supplied to the IFFT unit 95. An impulse response for the combination of the undesired signals from mobile terminals B and C is output from the IFFT unit 95. The timing error determination unit 98 determines a receiving timing difference between the desired signal and the undesired signals based on the impulse response supplied from the timing detector blocks.

With this embodiment, channel estimates of two or more undesired signals are combined into a single value to reduce the number of IFFT operations (or units) to two.

Embodiment 3

In the third embodiment, a frequency band is divided into multiple frequency blocks (or subcarrier blocks), which arrangement is different from the first and second embodiments in which each user uses the entire range of the frequency band. In general, each of the frequency blocks includes one or more subcarriers. Each user carries out radio communications using one or more frequency blocks. Under this arrangement, the mobile terminals still have to be in sync with each other; otherwise, the desired signal and undesired signals cannot be appropriately detected and the signal quality is degraded due to interference between the frequency blocks used by the desired signal and the undesired signals. The signal quality can be measured based on the bit error rate, throughput, SIR, etc.

Figure 13:
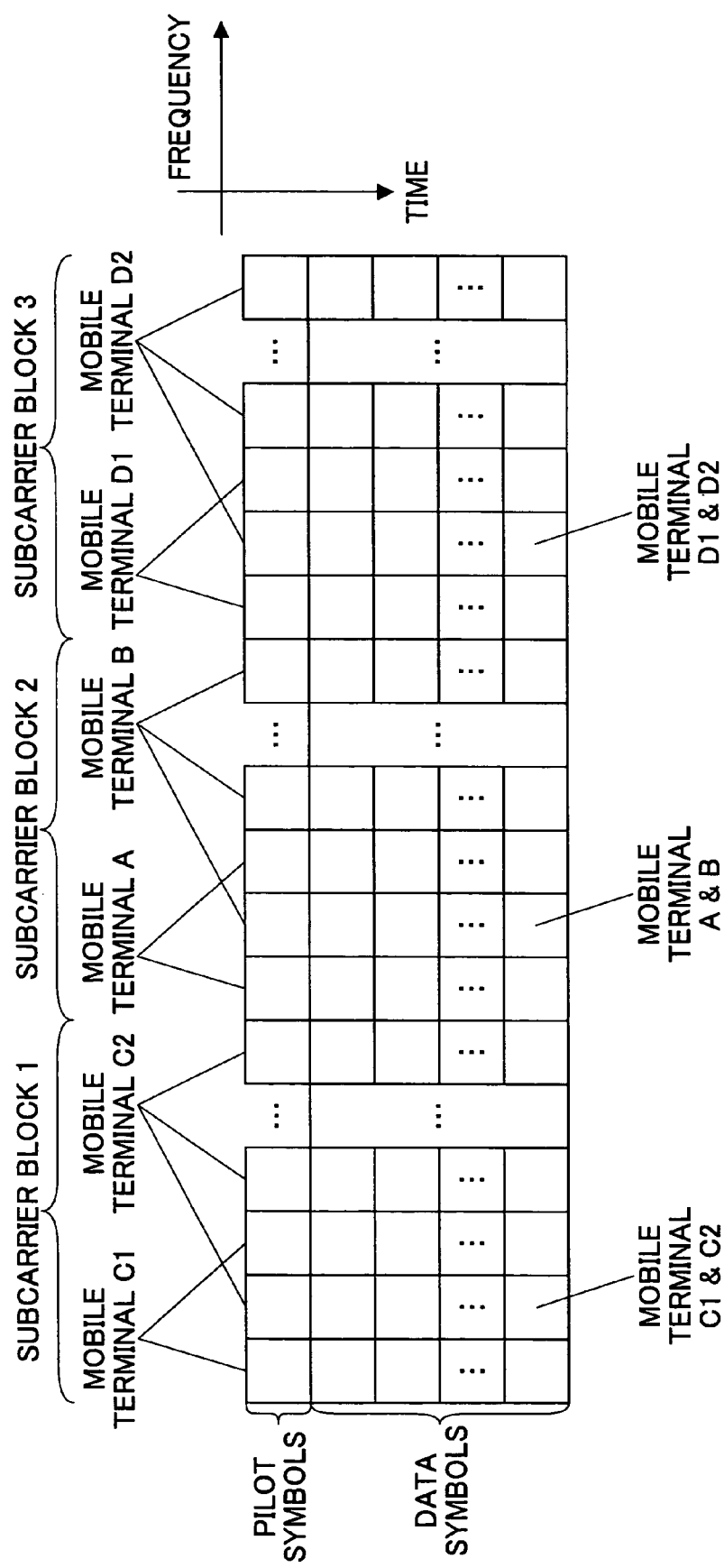
FIG. 13 illustrates another example of resource allocation for symbols according to an embodiment of the invention.

FIG. 13 is a schematic diagram illustrating an example of resource allocation for pilot symbols under the subcarrier block configuration. In this example, subcarrier block 1 is used by mobile terminals C1 and C2, subcarrier block 2 is used by mobile terminals A and B, and subcarrier block 3 is used by mobile terminals D1 and D2. Pilot symbols and data symbols are time-multiplexed.

Figure 14:
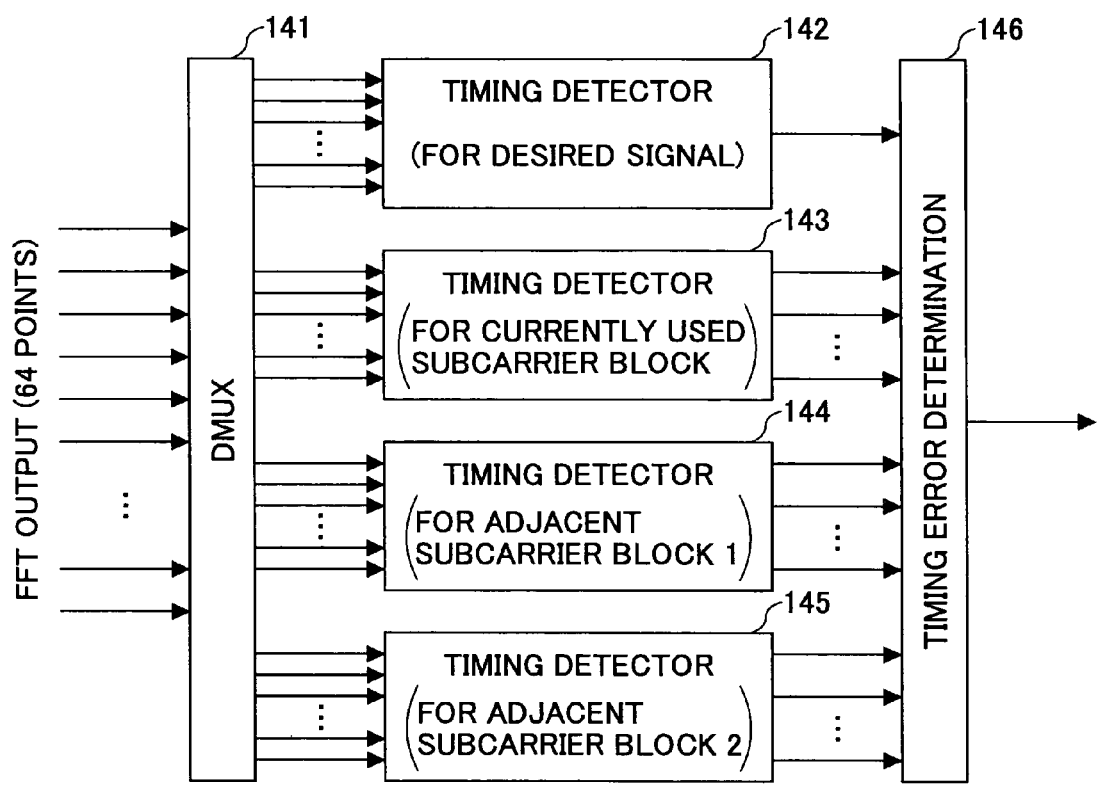
FIG. 14 is an example of the timing error detection unit.

FIG. 14 is a schematic block diagram of a timing error detection unit of this embodiment, which structure is applicable to the timing error detection unit 85 of FIG. 8. The timing error detection unit includes a demultiplexer 141, four timing detector 142, 143, 144 and 145, and a timing error determination unit 146. The demultiplexer 141 detects each of the pilot symbols according to the resource allocation patterns shown in FIG. 13, and output the detected pilot symbols. Each of the timing detectors 141 through 145 has a pilot signal dividing unit, an IFFT unit, and a timing determination unit, as illustrated in FIG. 9. The first timing detector 142 performs signal processing on the desired signal (from mobile terminal A in this example) to detect the receiving timing of the desired signal. The other timing detectors 143-145 perform signal processing on the undesired signals to detect receiving timings of the undesired signals. Such signal processing includes division of the associated pilot signal, inverse fast Fourier transform, and timing determination carried out by the pilot signal dividing unit, the IFFT unit, and the timing determination unit, which operations are explained above. For example, the timing detector 143 performs signal processing for the undesired signal (from mobile terminal B in this example) sharing the subcarrier block with the desired signal. The timing detectors 144 and 145 perform signal processing for desired signals using adjacent subcarrier blocks 1 and 3. Concerning the timing detection of undesired signals from adjacent subcarrier blocks, receiving timings of all the undesirable signals may be detected independently, or alternatively, a receiving timing of a combination of two or more undesired signals from the adjacent subcarrier blocks may be detected.

Figure 15:
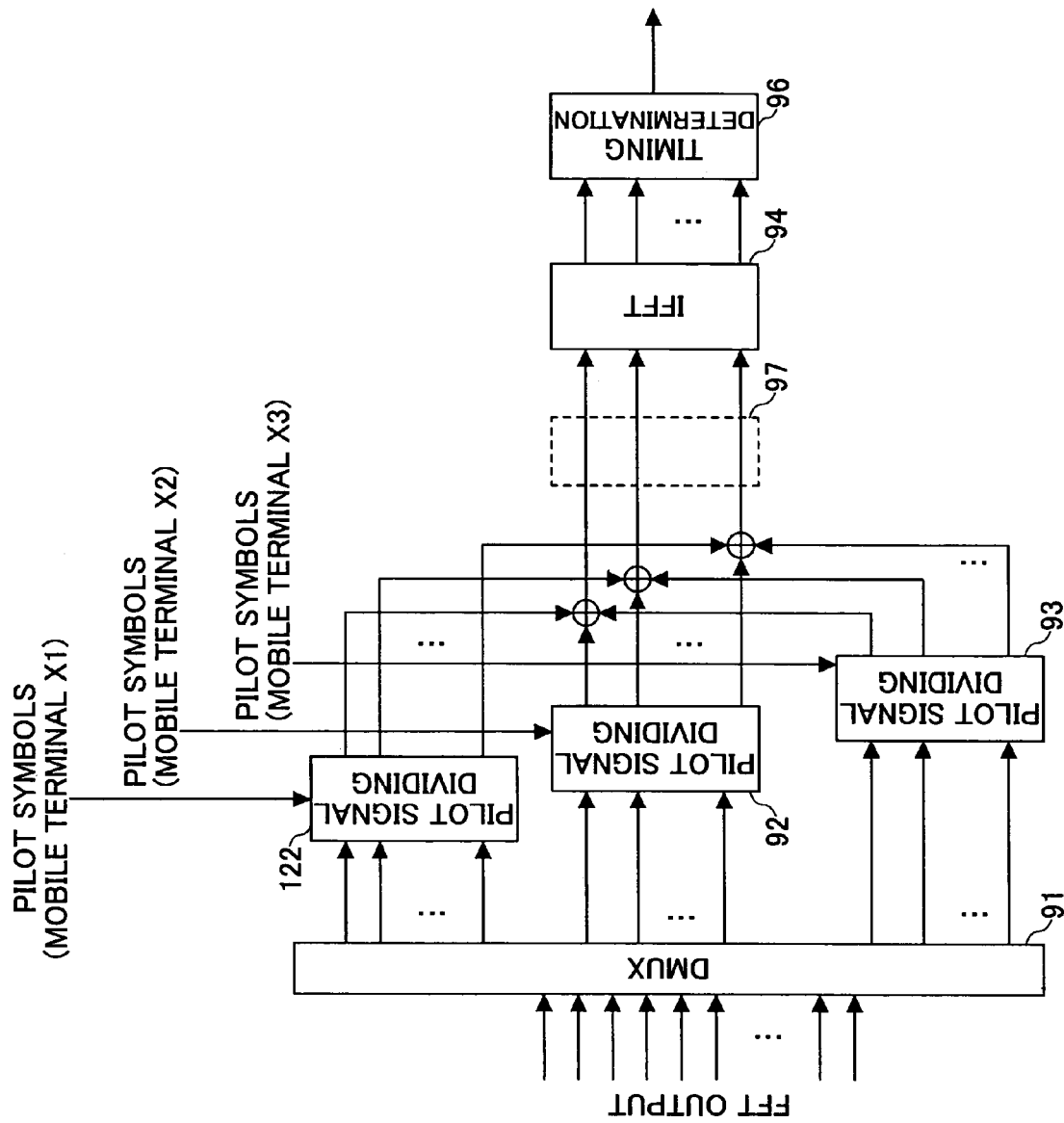
FIG. 15 is another example of the timing error detection unit.
Figure 16:
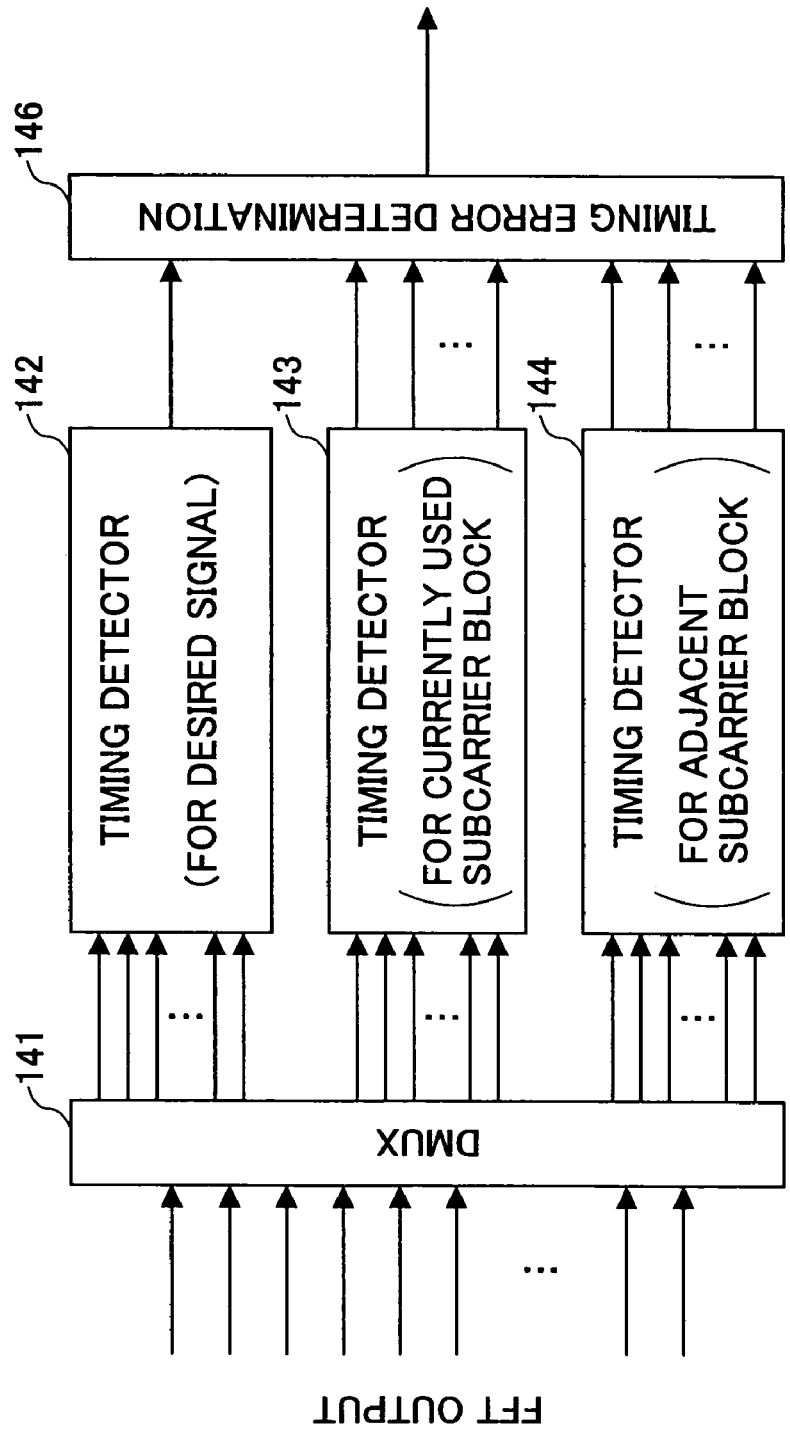
FIG. 16 is still another example of the timing error detection unit.

In the latter case, the structure shown in FIG. 15 may be employed to reduce the number of the IFFT operations (or units). Concerning the timing detector 142 for the desired signal and the timing detector 143 for the undesired signal in the same subcarrier block, a part of the structure can be shared because the same channel correction is performed. When a receiving timing for the adjacent subcarrier blocks 1 and 3 is determined from the combination of the undesired signals as described above, a timing error detection unit 85 may employ a structure shown in FIG. 16. In addition, a receiving timing may be determined collectively for the combination of all the undesirable signals, including one in the same subcarrier block with the desired signal.

Only one adjacent subcarrier block may exist. If mobile terminal A is using only a subcarrier block 1, there is only one adjacent subcarrier block 2.

Embodiment 4

It is desired for all the transceivers (mobile terminals) to communicate in sync with each other; however, in the actual communication environment, all the users cannot always perform signal transmission at ideal timings depending on the positional relationship between the mobile terminals. Because the interference level from a non-counterpart device using the same subcarrier is generally conspicuous, the receiving timing of the signal from such device may be taken more into account than the signals using other subcarriers.

Figure 17:
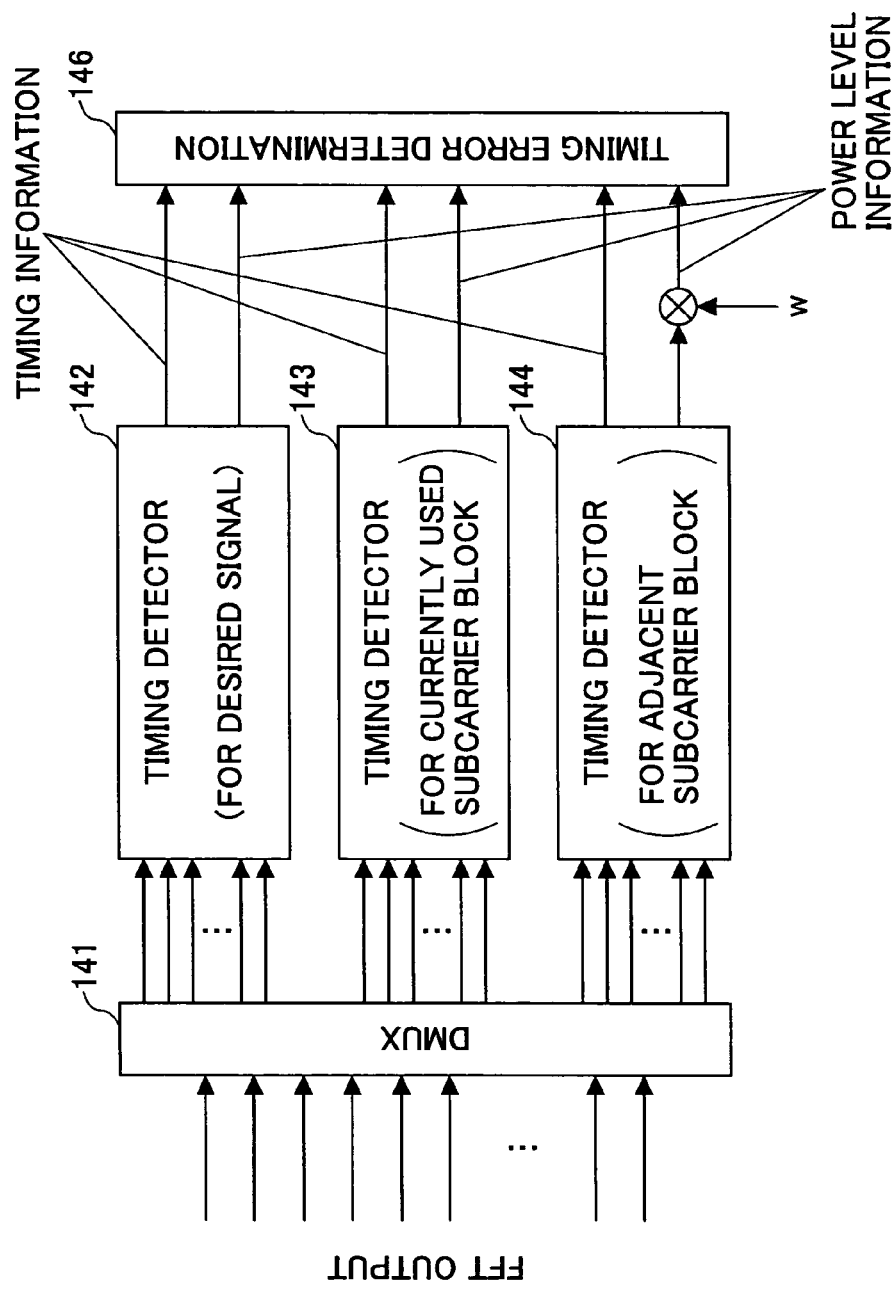
FIG. 17 is yet another example of the timing error detection unit.

FIG. 17 is a schematic block diagram of a timing error detection unit according to the fourth embodiment. Each of the timing detectors outputs information about receiving timing and information about power level for that receiving timing. These information items are input to the timing error determination unit 146. The power level for the receiving timing of the signal from the adjacent subcarrier block is weighted using an appropriate weighting factor, and the weighted power level is input to the timing error determination unit 146. With this arrangement, a receiving timing difference can be determined more appropriately because the contribution of the undesired signals from the subcarrier blocks other than that of the desired signal is appropriately considered.

Figure 18:
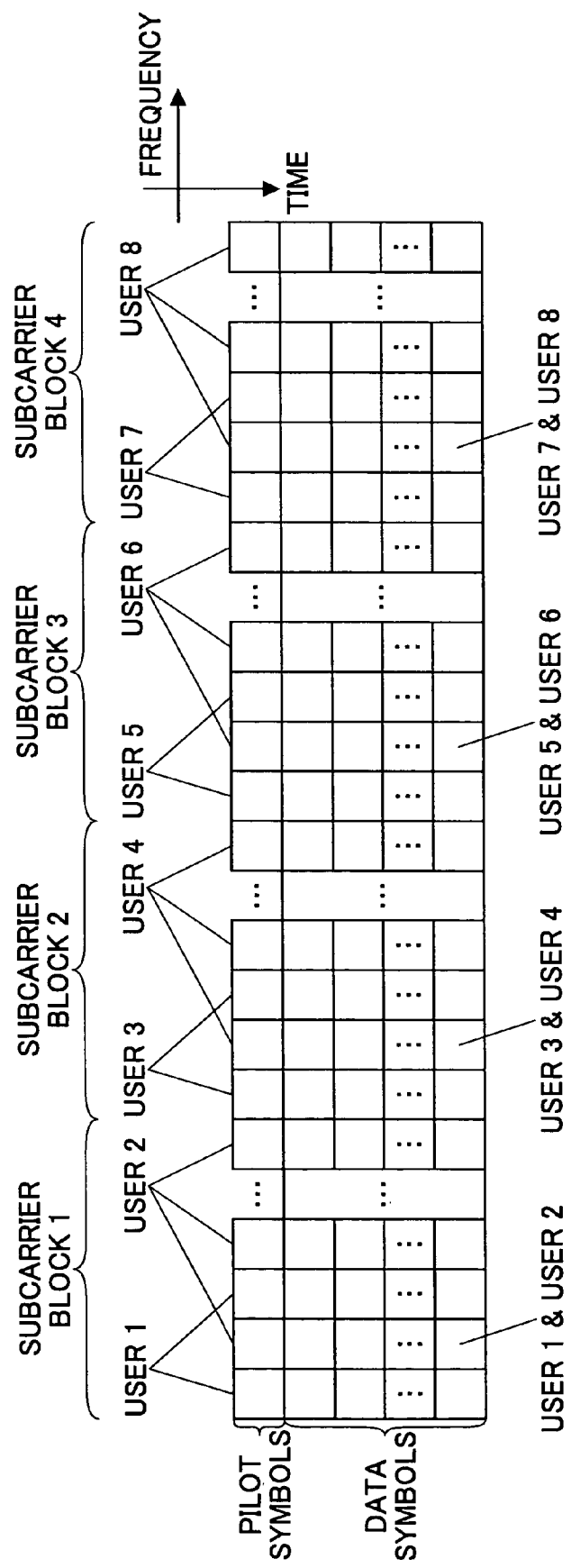
FIG. 18 illustrates still another example of resource allocation for symbols according to an embodiment of the invention.

FIG. 18 illustrates another example of resource allocation for pilot symbols where more subcarrier blocks are included in a frequency band. In this case, in addition to the adjacent subcarrier blocks, the contribution of the next adjacent subcarrier blocks is also considered. In general, the adjacent subcarrier blocks have greater influence than the next adjacent subcarrier blocks, and therefore, the weighting factor w1 for the former one is greater than weighting factor w2 for the latter one (1>w1>w2).

Figure 19:
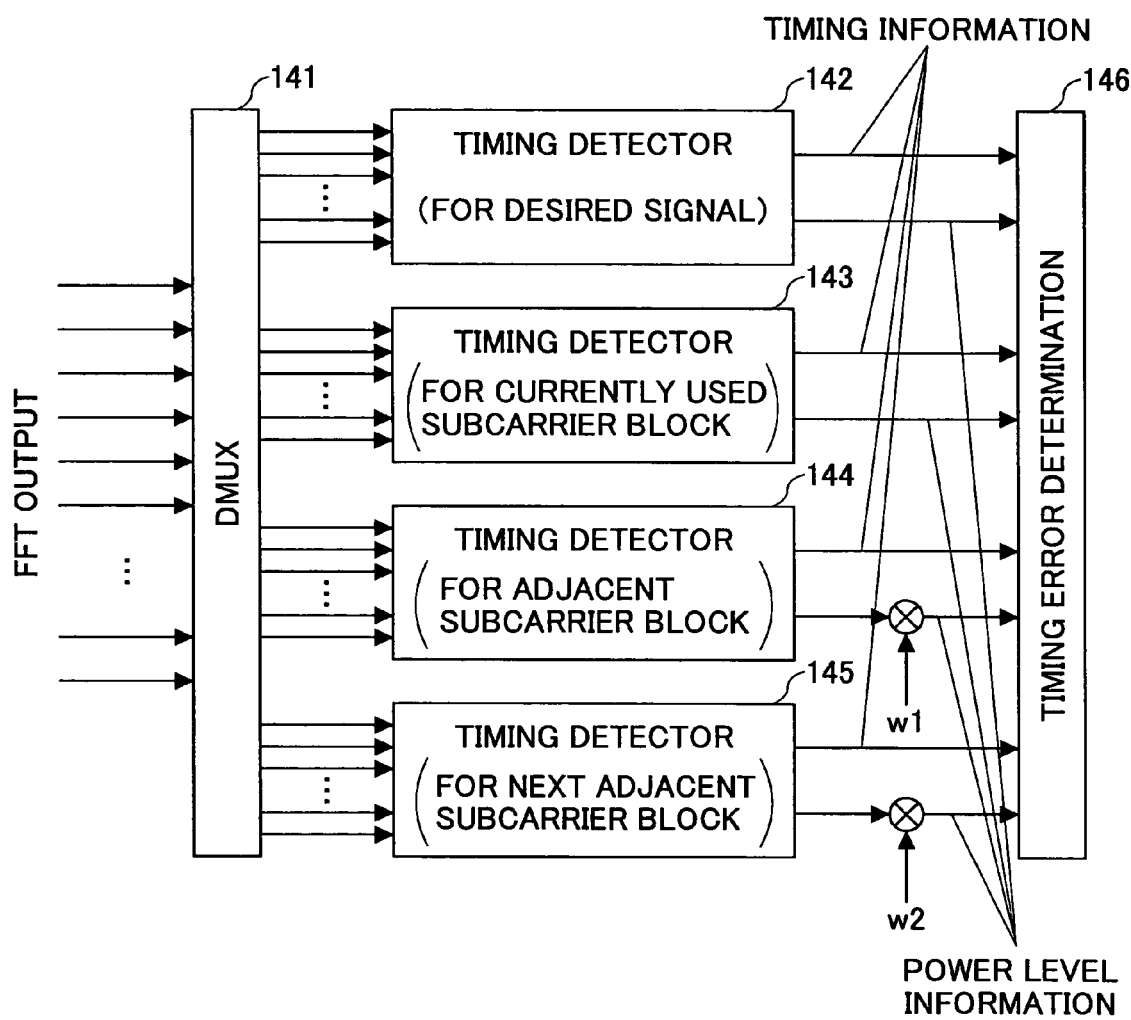
FIG. 19 is yet another example of the timing error detection unit.

FIG. 19 is a schematic block diagram of a timing error detection unit using two different weighting factors. The power level for the receiving timing of the adjacent subcarrier block is multiplied by weighting factor w1 and the weighted value is input to the timing error determination unit 146. Similarly, the power level for the receiving timing of the next adjacent subcarrier block is multiplied by weighting factor w2 and the weighted value is input to the timing error determination unit 146. The weighting factors may be varied in an adaptive manner, or alternatively, various levels of weighting factors may be prepared in advance through simulation and/or experiment.

Although in this embodiment only two weighting factors are used, an appropriate number of weighting factors may be used.

Embodiment 5

In order to detect receiving timings of the desired signal and undesired signals, the pilot symbols for these signals have to be known in advance. When a counterpart or non-counterpart mobile terminal is using two or more subcarrier blocks, it is necessary to know two or more associated pilot symbols.

Figure 20:
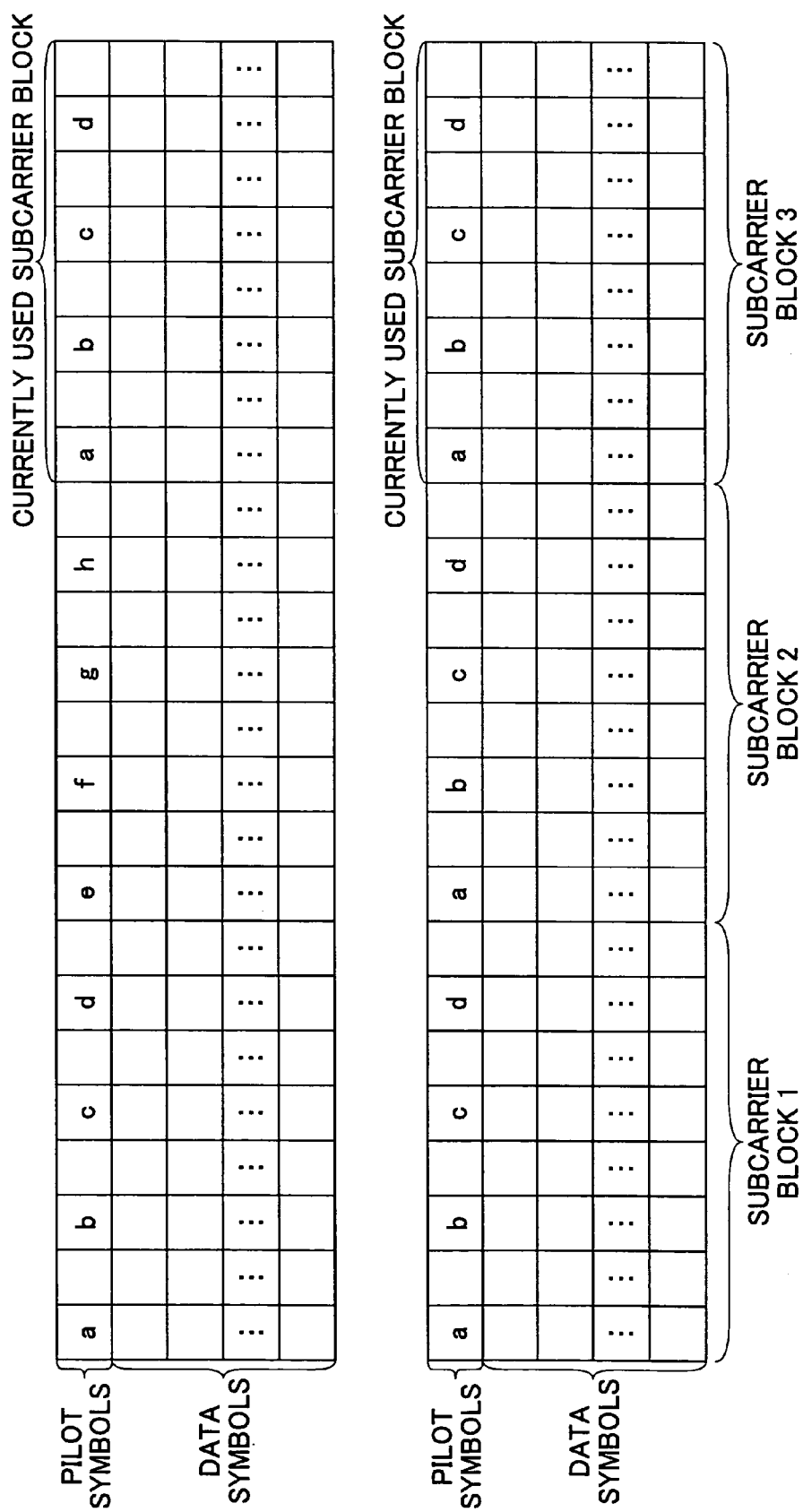
FIG. 20 illustrates yet another example of resource allocation for symbols.

FIG. 20 illustrates an example of resource allocation for pilot symbols, in which subcarrier block 3 is currently used for communications between a focused-on mobile terminal and the counterpart mobile terminal. In the top example in FIG. 20, another user is using subcarrier blocks 1 and 2, while in the bottom example two other users are using subcarrier blocks 1 and 2, respectively. When the subcarrier blocks 1 and 2 are used by a single user, the resource allocation pattern "abcdefgh" is set for the pilot symbols. When a user uses a single subcarrier block, resource allocation pattern "abcd" is set for the pilot symbols. The receiver has to determine the utilized condition of adjacent subcarrier blocks (whether the top pattern or the bottom pattern of FIG. 20 is used) to set pilot symbols. Such a process may be complicated to some extent.

Figure 21:
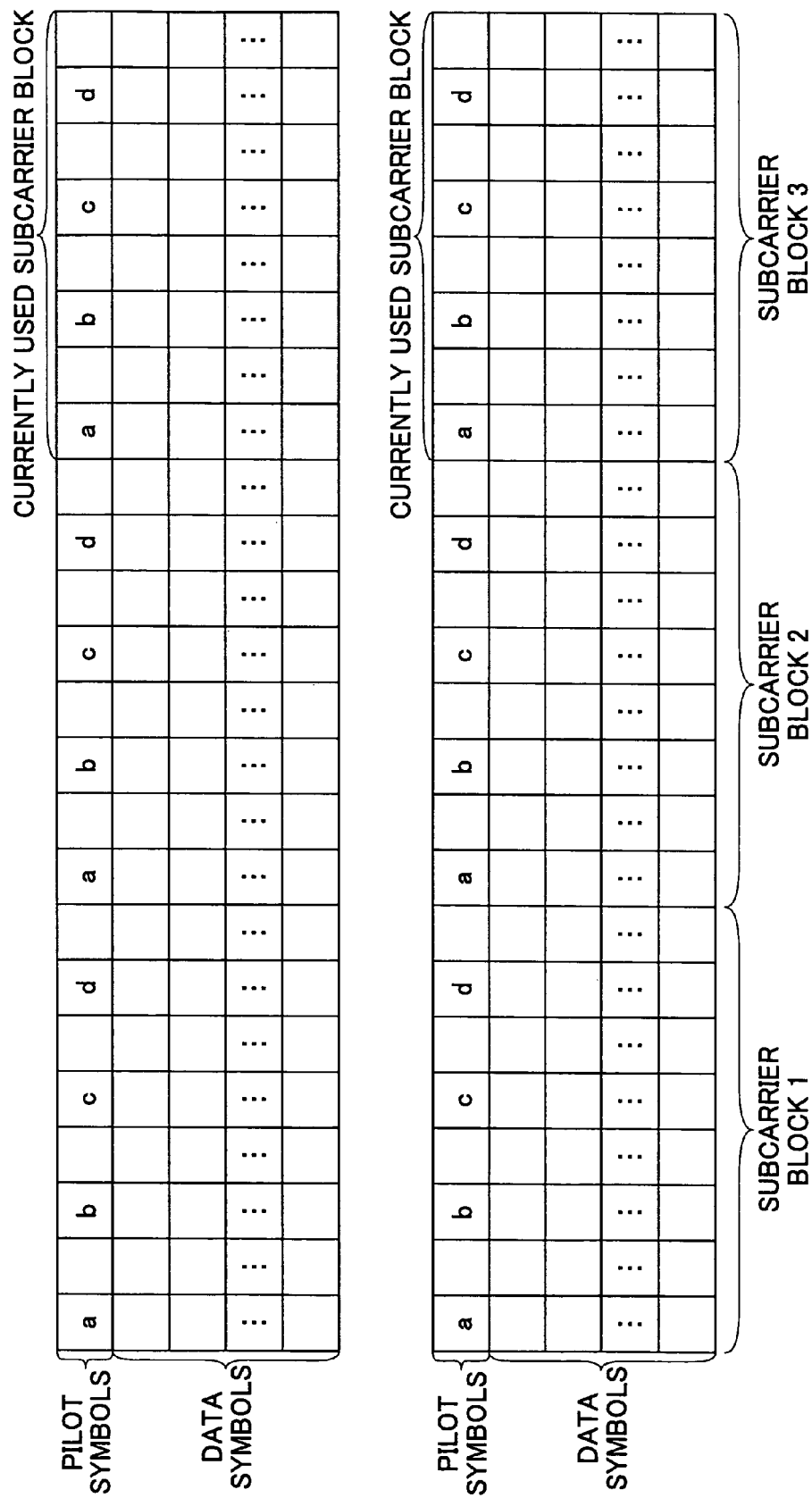
FIG. 21 illustrates resource allocation for symbols according to an embodiment of the invention.
Figure 22:
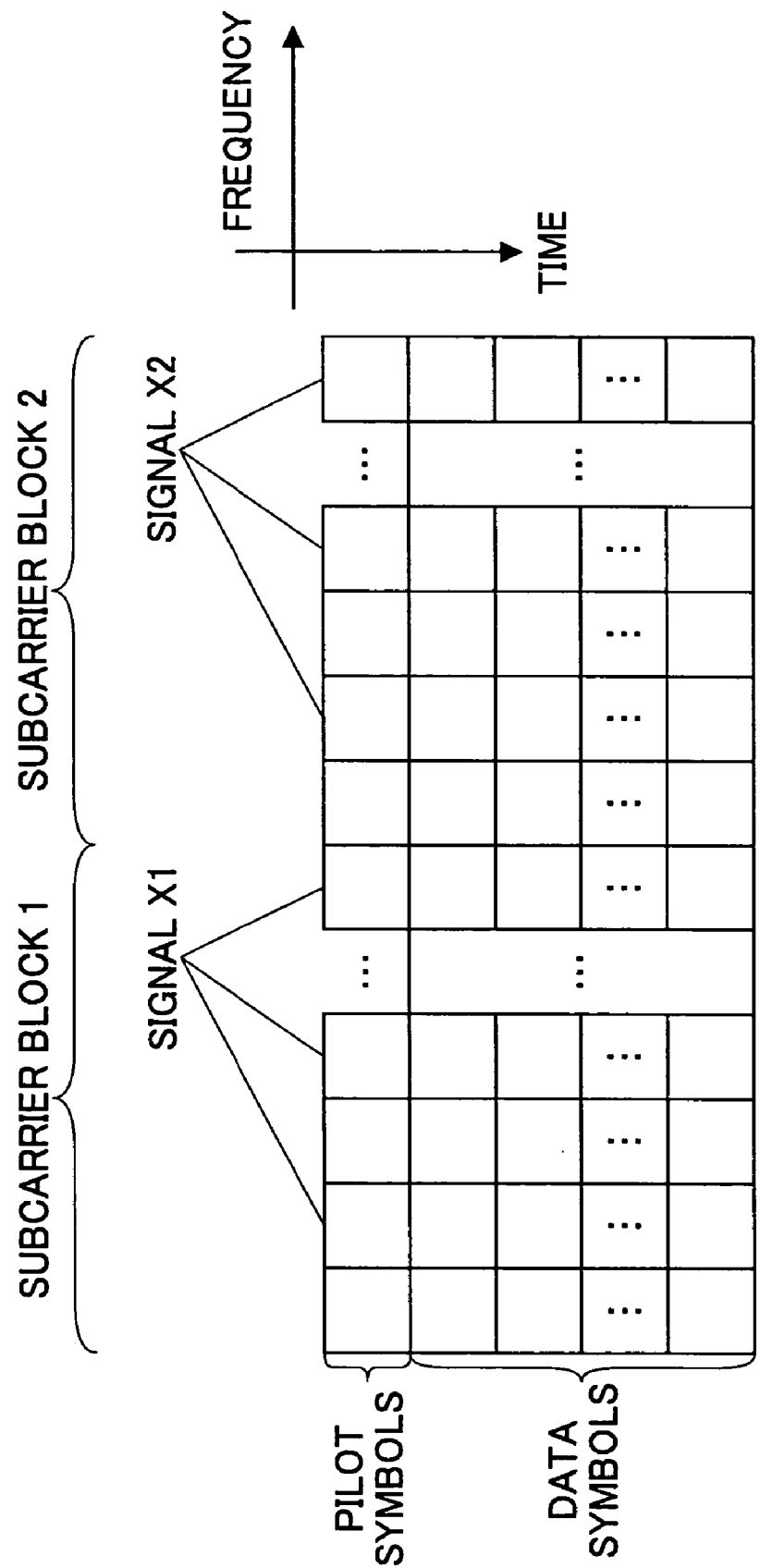
FIG. 22 illustrates yet another example of resource allocation for symbols.

FIG. 21 illustrates still another example of resource allocation for pilot symbols. In this example, a resource allocation pattern assigned to a case in which a single subcarrier block is used by a user is used as a reference pattern. When two or more subcarrier blocks are used by a user, the reference pattern is repeated twice or more. If the reference pattern is "abcd", then resource allocation pattern for two subcarrier blocks used by a user becomes "abcdabce". If three subcarrier blocks are used, the resource allocation pattern becomes "abcdabcdabcd". This arrangement allows the timing detector to appropriately determine the resource allocation pattern for the associated pilot symbols regardless of how many subcarrier blocks are occupied by a non-counterpart mobile terminal currently using the adjacent subcarrier block.

Taking advantage of the regularity of resource allocation for pilot symbols, the timing error detection unit can be configured to have only one pilot signal dividing unit placed at a dashed block 97 between the adder and the IFFT unit 94, as illustrated in FIG. 15, instead of using three pilot signal dividing units 92, 93 and 122. The number of pilot symbol dividing units can be reduced, and the structure and arithmetic workload can be simplified.

Embodiment 6

Next, consideration is made of a method of determining how many subcarrier blocks are used by a non-counterpart mobile terminal in the above-described example. This issue is equivalent to determining whether a signal x1 in a subcarrier block 1 and a signal x2 in a subcarrier block 2 are transmitted from the same mobile terminal. The signals x1 and x2 are pilot symbols with a resource allocation pattern "abcd".

Figure 23:
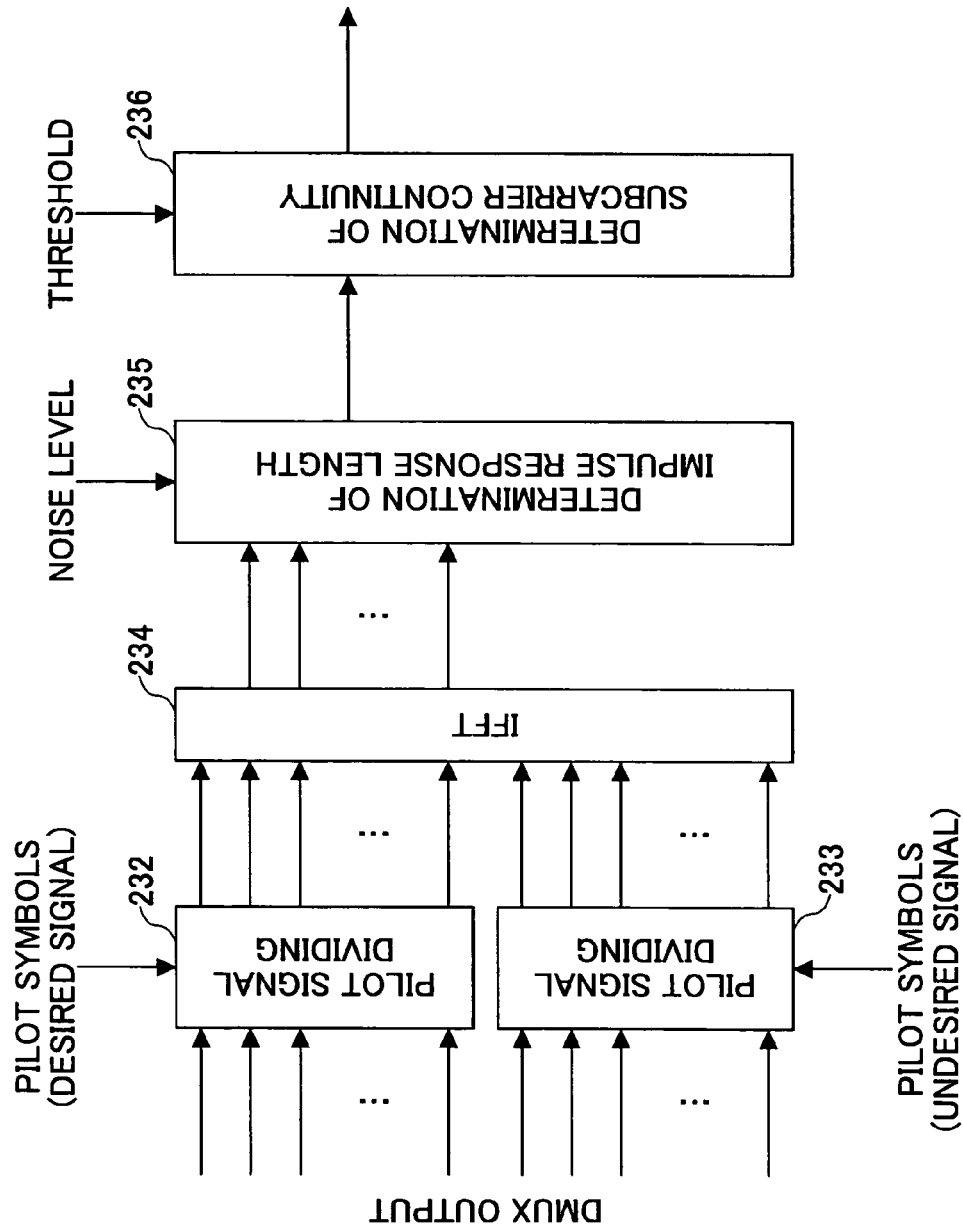
FIG. 23 is a schematic block diagram illustrating a structure for determining continuity of currently used subcarrier blocks.

FIG. 23 illustrates an example of the structure suitable for determining the use of successive subcarrier blocks for determining whether an adjacent subcarrier block is used by a same mobile terminal. This structure includes pilot signal dividing units 232 and 233, an IFFT unit 234, an impulse response length determination unit 235, and a continuity determination unit 236. The demultiplexing unit (not shown in FIG. 23) detects pilot symbols for each of the subcarrier blocks (for signals X1 and X2), and supplies the detected set of pilot symbols to the associated one of the pilot signal dividing units 232 and 233. Each of the pilot signal dividing units 232 and 233 outputs a frequency-domain channel estimate to the IFFT unit 234. The IFFT unit 234 performs inverse fast Fourier transform collectively on the channel estimates of the two subcarrier blocks 1 and 2, and output impulse responses. The impulse response length determination unit 235 appropriately modifies the impulse response lengths based on noise levels. For example, some signal components may appear in an impulse response due to influence of noise in a section in which no paths could exist. To correct the impulse response value, such irrelevant signal components are removed by setting an appropriate threshold. The threshold is set preferably based on the noise level estimated by the receiver. If the time axis of the impulse response derived from the received signal from a mobile terminal is divided into two sections, namely, section P1 in which one or more paths exist and section P2 in which no paths could exist, the threshold may be set to an average power level of section P2, which level equals T2*(noise level estimation value), where T2 is a constant greater than or equal to 1 ($T2 \geq 1$) determined by simulation or other suitable means.

Figure 24:
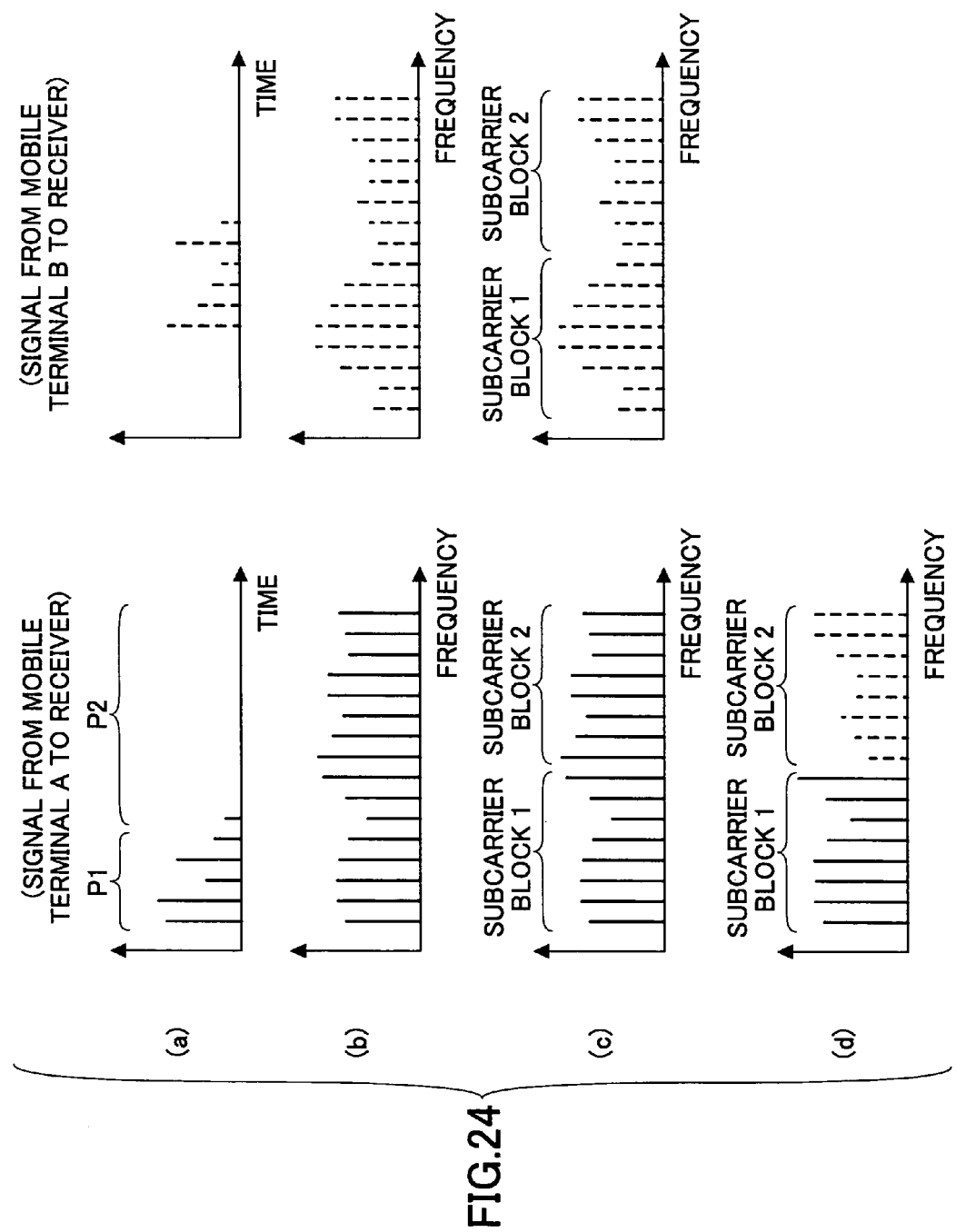
FIG. 24 is a schematic diagram for explaining the determination of continuity of subcarrier blocks.

The continuity determination unit 236 determines whether adjacent subcarrier blocks are used by the same mobile terminal, based on the appropriately modified impulse response. If signals X1 and X2 are transmitted from a same mobile terminal, then the impulse responses converge within a short interval of time along the time axis, as illustrated in FIG. 24. In contrast, if signals X1 and X2 are transmitted from different mobile terminals, the time interval of impulse responses is likely to become much longer.

It should be noted that a threshold for the length time interval) of section P1 also has to be determined appropriately. If the impulse response length is shorter than the threshold, it is determined that the same mobile terminal is using the subcarrier blocks 1 and 2. The threshold may be the maximum value of the channel impulse response length acquired when IFFT is applied to a signal, or the length of the guard interval.

With this embodiment, as long as a mobile terminal is using successive subcarrier blocks under the situation where multiple subcarrier blocks are available for the user, the number of subcarrier blocks used by each of the mobile terminals can be determined easily, while using pilot symbols illustrated in Embodiment 5.

Embodiment 7

In the previous embodiment, an IFFT unit 234 is used to perform inverse fast Fourier transform collectively on the signals from two subcarrier blocks to determine whether a mobile terminal is using multiple successive subcarrier blocks. In this embodiment, determination of continuity of subcarrier blocks is performed without using IFFT.

Figure 25:
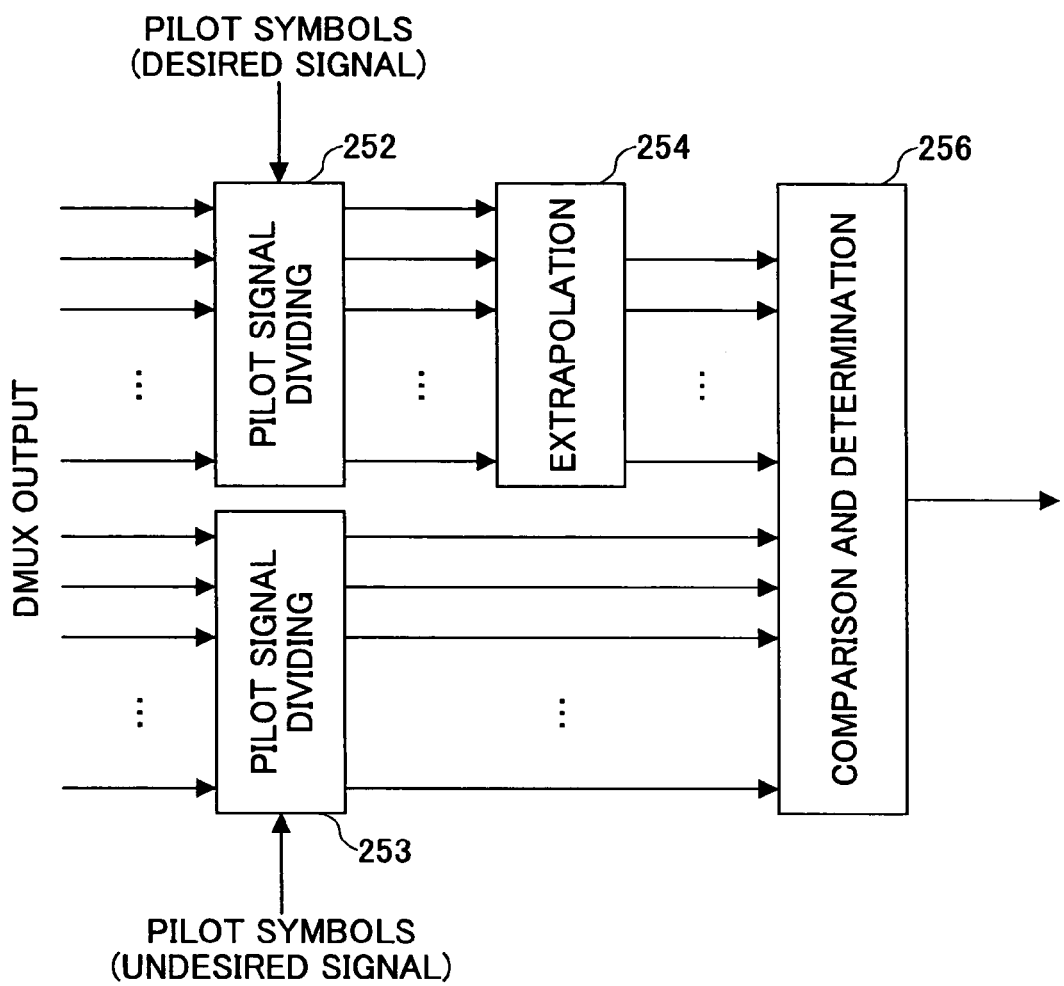
FIG. 25 is a schematic block diagram illustrating another structure of subcarrier continuity determination.

FIG. 25 is a schematic diagram illustrating another example of determination of use of successive subcarrier blocks. This structure includes pilot signal dividing units 252 and 253, an extrapolation unit 254, and a comparison and determination unit 256. The pilot signal dividing units 252 and 253 serve in a manner similar to those shown in FIG. 23, and output frequency-domain channel estimates. The extrapolation unit 254 performs extrapolation on one of the frequency-domain channel estimates, and supplies the extrapolated channel estimate to the comparison and determination unit 256. The comparison and determination unit 256 compares the extrapolated channel estimate with the other non-extrapolated channel estimate.

Figure 26:
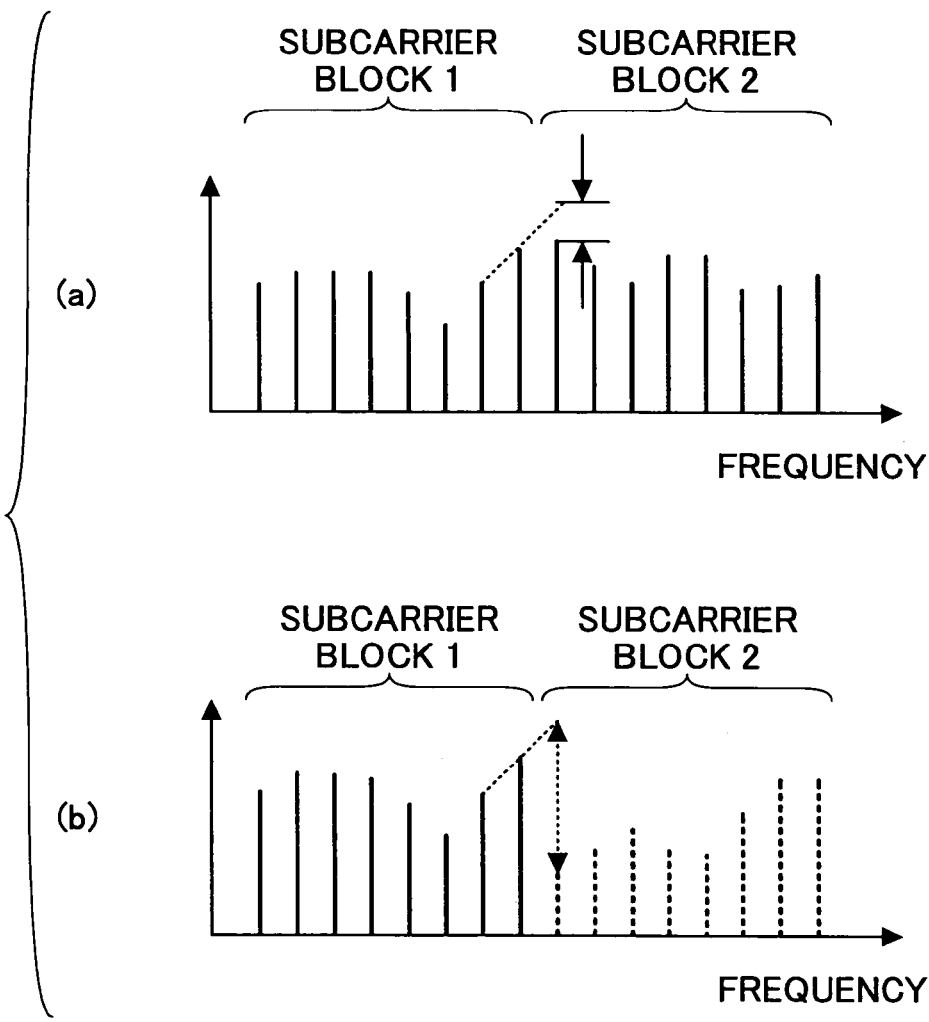
FIG. 26 is a schematic diagram for explaining the determination of continuity of subcarrier blocks.

FIG. 26 illustrates two examples of extrapolation using a linear interpolation method. In example (a), the difference between adjacent two subcarriers is within a range anticipated by extrapolation, which means that the adjacent subcarrier blocks are used by the same mobile terminal. In example (b), the difference between adjacent subcarriers is out of the range anticipated by extrapolation, which means that these adjacent subcarrier blocks are used by different mobile terminals. Whether the difference is within the anticipated range is determined using a prescribed threshold. Although in this example only one of the I-phase component and the Q-phase component is depicted, it is preferable to use both the I-phase component and the Q-phase component to determine the continuity.

Embodiment 8

In this embodiment, detection of the initial timing of fast Fourier transform (FFT) is explained, which technique is applicable to the initial timing detection unit 81 shown in FIG. 8. In the multipath propagation environment, multiple delayed waves with respect to a transmission signal successively arrive at the receiver at various angles and various delay times.

Figure 27:
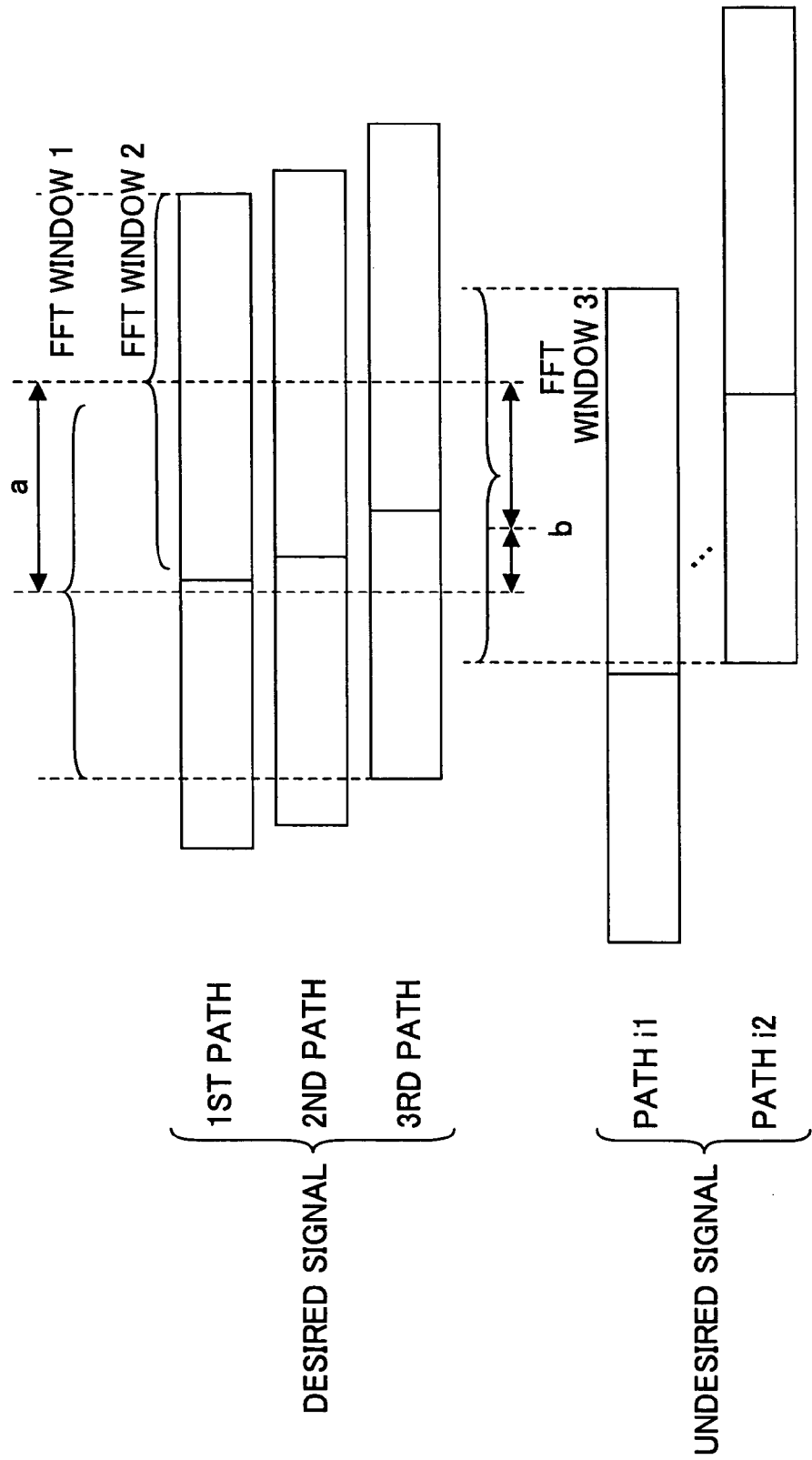
FIG. 27 is a schematic diagram illustrating the relationship between an FFT window and delayed waves.

FIG. 27 is a diagram illustrating three delayed waves of the desired signal and two delayed waves of the undesired signal. These signals are OFDM signals. Each OFDM symbol has a guard interval and an effective symbol section. The information contained in the guard interval is a copy of a portion of the effective symbol section. An FFT window is determined according to the length of the effective symbol section. In an OFDM scheme, as long as the amount of delay from the first arriving wave is within the guard interval, intersymbol interference can be reduced effectively.

Focusing on the desired signal, if an FFT window is set within the range "a" between FFT window 1 (timing 1) and FFT window 2 (timing 2), then signals are received in satisfactory conditions. Taking a non-counterpart mobile terminal into account, it is assumed that the non-counterpart mobile terminal transmits signals in sync with transmission between the receiver (i.e., the focused-on mobile terminal) and the counterpart mobile terminal. It is expected that the paths from the non-counterpart mobile terminal disperse uniformly at the receiver within the time period centering on the receiving timing of the receiver. In this case, if fast Fourier transform is performed in FFT window 1, the entire effective symbol section of a signal (such as the second path $i_2$ of the undesired signal) arriving after the third delayed wave of the desired signal cannot be received within the FFT window 1. On the other hand, if FFT is performed in FFT window 2, the entire effective symbol section of a path (such as the first path $i_1$ of the undesired signal) arriving before the first delayed wave of the desired wave may not be received within the FFT window 2. In order to correctly estimate the receiving timing of each of the arriving signals, all the symbol sections of the multipath components have to be received within an FFT window.

In this embodiment, an internally dividing point (timing) for dividing the acceptable timing range "a", which range is accepted when considering only the desired signal, by the ratio of x to (1−x) is used as timing of the FFT window, where x is greater than 0 and smaller than 1. Preferably, x is smaller than 0.5 (x<0.5). This arrangement is based on the general idea that an earlier arriving wave has a higher power level than a later arriving wave.

The acceptable range "a" may be determined using the receiving timing of the desired signal, or alternatively, using the pilot symbols of the desired symbols and the pilot symbols used by non-counterpart mobile terminals. For example, correlation between the received signal and the pilot symbols of the desired signal and correlation between the received signal and the pilot symbols of the non-counterpart mobile terminal are determined, and the correlation values are added to determine the initial timing of FFT operation.

The FFT window determined by the above-described method may not be the optimum means for the receiving timing of the desired wave depending on the situation. Although the FFT window is suitable for detection of synchronization error, it may not be the optimum means for data detection or channel estimation. Accordingly, it is desired to determine timing for synchronization error detection and timing for channel estimation independently to set appropriate timing for each process.

Embodiment 9

Figure 28:
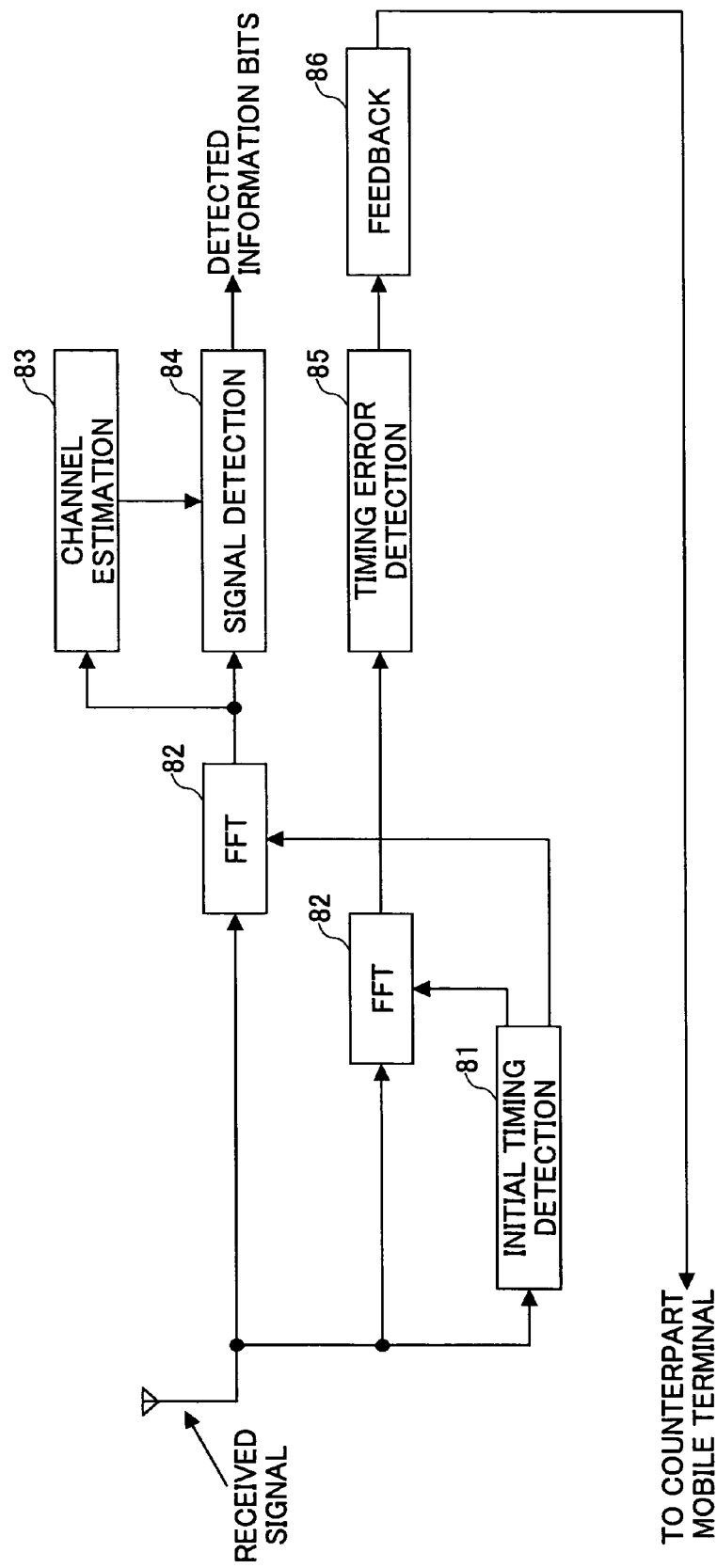
FIG. 28 is a schematic block diagrams of a receiver used in a transceiver according to another embodiment of the invention.
Figure 29:
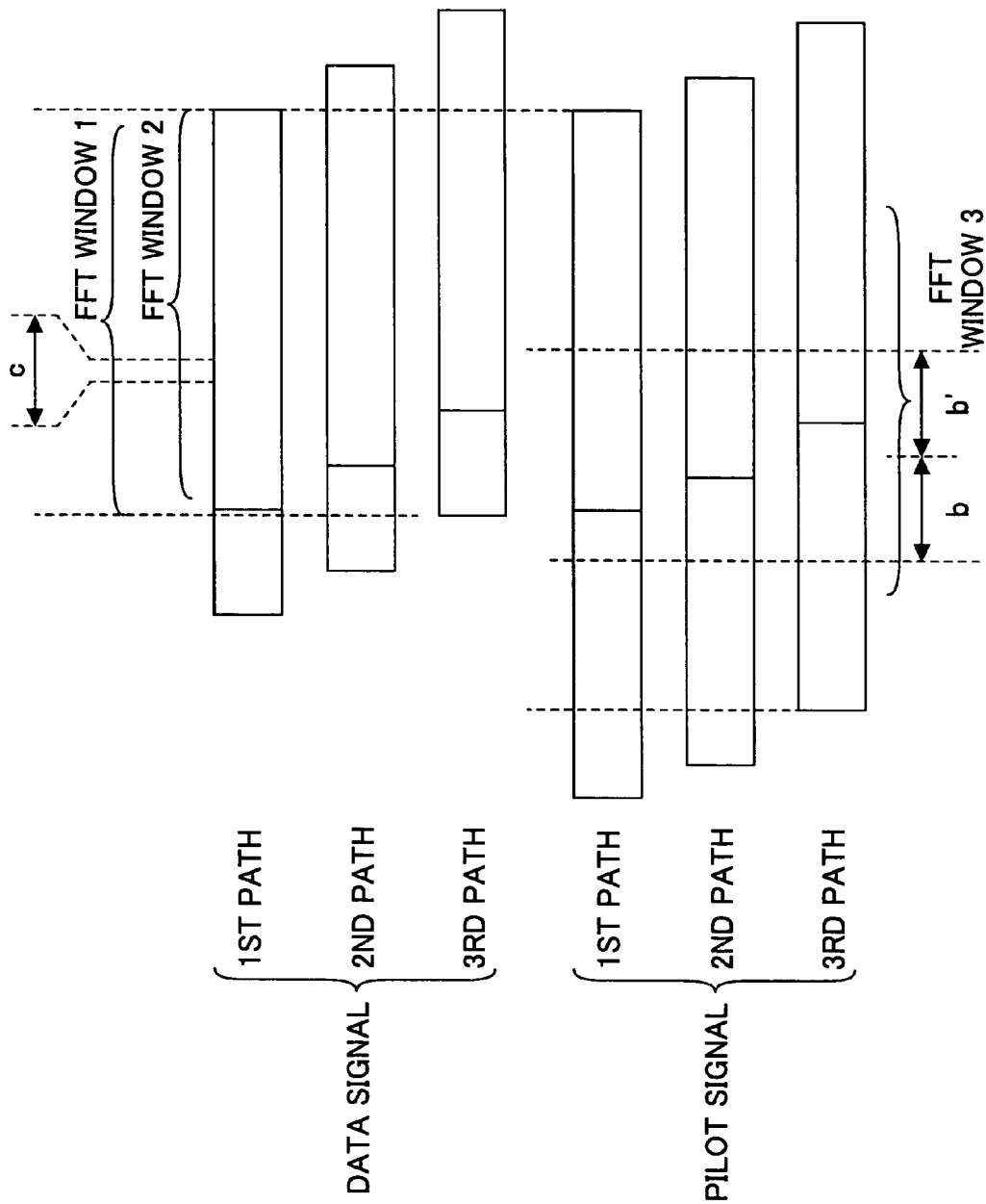
FIG. 29 is a schematic diagram illustrating the relationship between the FFT window and delayed waves.

As has been described above, if delayed waves reside within the range of the guard interval, intersymbol interference can be reduced efficiently. Accordingly, it is desired from the viewpoint of reliability of information transmission that the guard interval be long. Guard interval is, however, created by copying a portion of the effective symbol section, and therefore, it is undesirable from the viewpoint of information transmission efficiency that the guard interval be long. To deal with this problem, it is proposed to prepare two types of guard intervals with different lengths, and to use the longer one for transmission of pilot symbols, while using the shorter one for transmission of data symbols. If long and short time intervals are used, it is preferred to perform FFT on each of the data symbol set and the pilot symbol set. In this case, an FFT window is provided for each of the FFT operations. FIG. 28 is a block diagram of a receiver with such a structure, and FIG. 29 illustrates setting of FFT windows for data symbols and pilot symbols, respectively. The FFT windows are set using an appropriate method explained in the eighth embodiment. With the structure shown in FIG. 28, however, FFT operations have to be independently carried out twice at different timings. To overcome this inconvenience, the structure shown in FIG. 30 may be employed.

Figure 30:
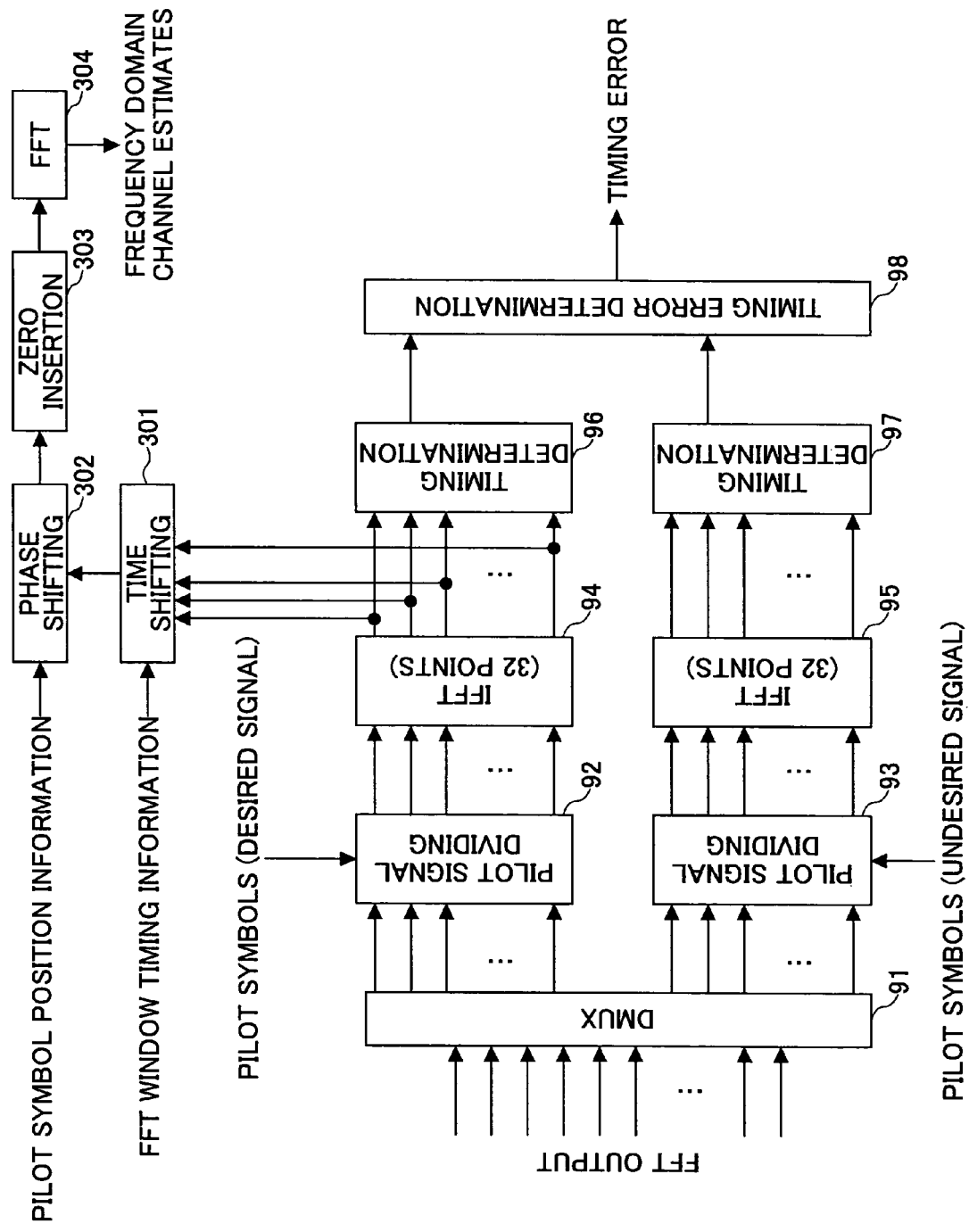
FIG. 30 is yet another example of the timing error detection unit according to an embodiment of the invention.

FIG. 30 is a block diagram of a timing error detection unit applicable to this embodiment. The same components as those shown in FIG. 9 are denoted by the same symbols, and additional components relating to channel estimation are also depicted. One of the IFFT units 94 and 95 (IFFT unit 94 in this example) is connected to a series of components of time shifting unit 301, phase shifting unit 302, zero inserting unit 303, and an FFT unit 304. The time shifting unit 301 shifts an FFT timing with a shifting amount corresponding to a time difference "c" between the FFT window for timing error detection and the FFT window for data detection. The relationship between the time difference "c" and the FFT windows is illustrated in FIG. 31.

Figure 32:
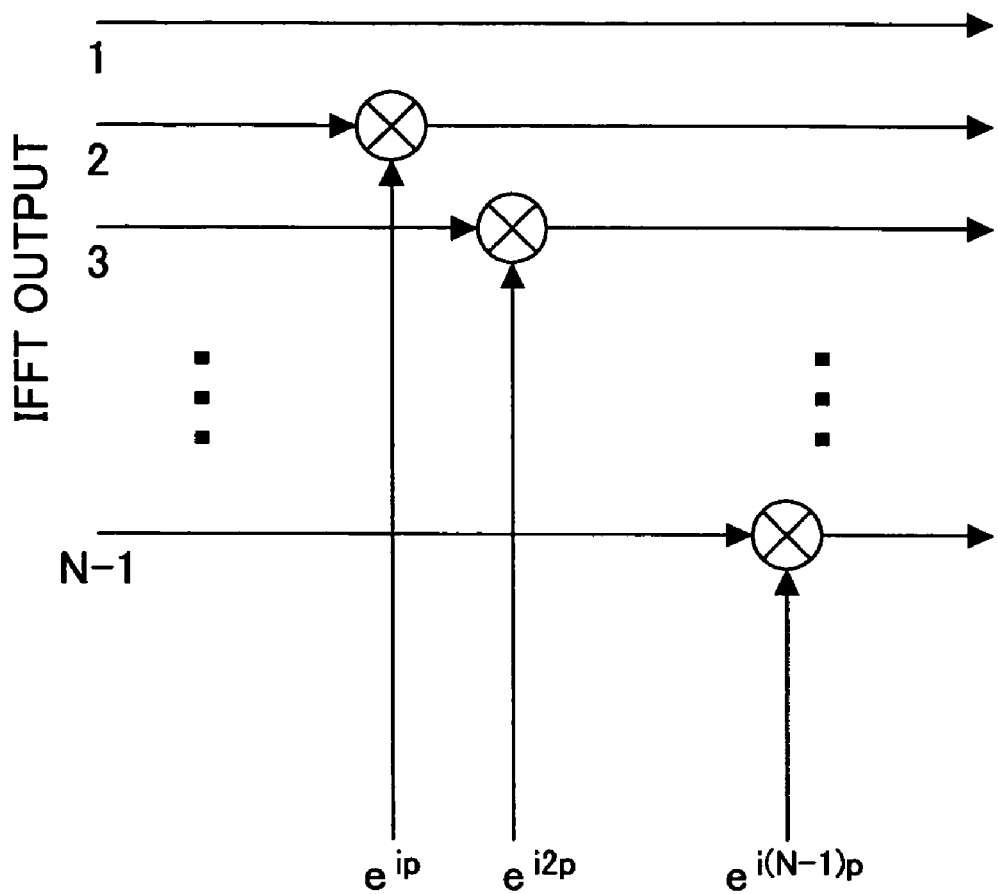
FIG. 32 illustrates an example of phase shift unit.
Figure 33:
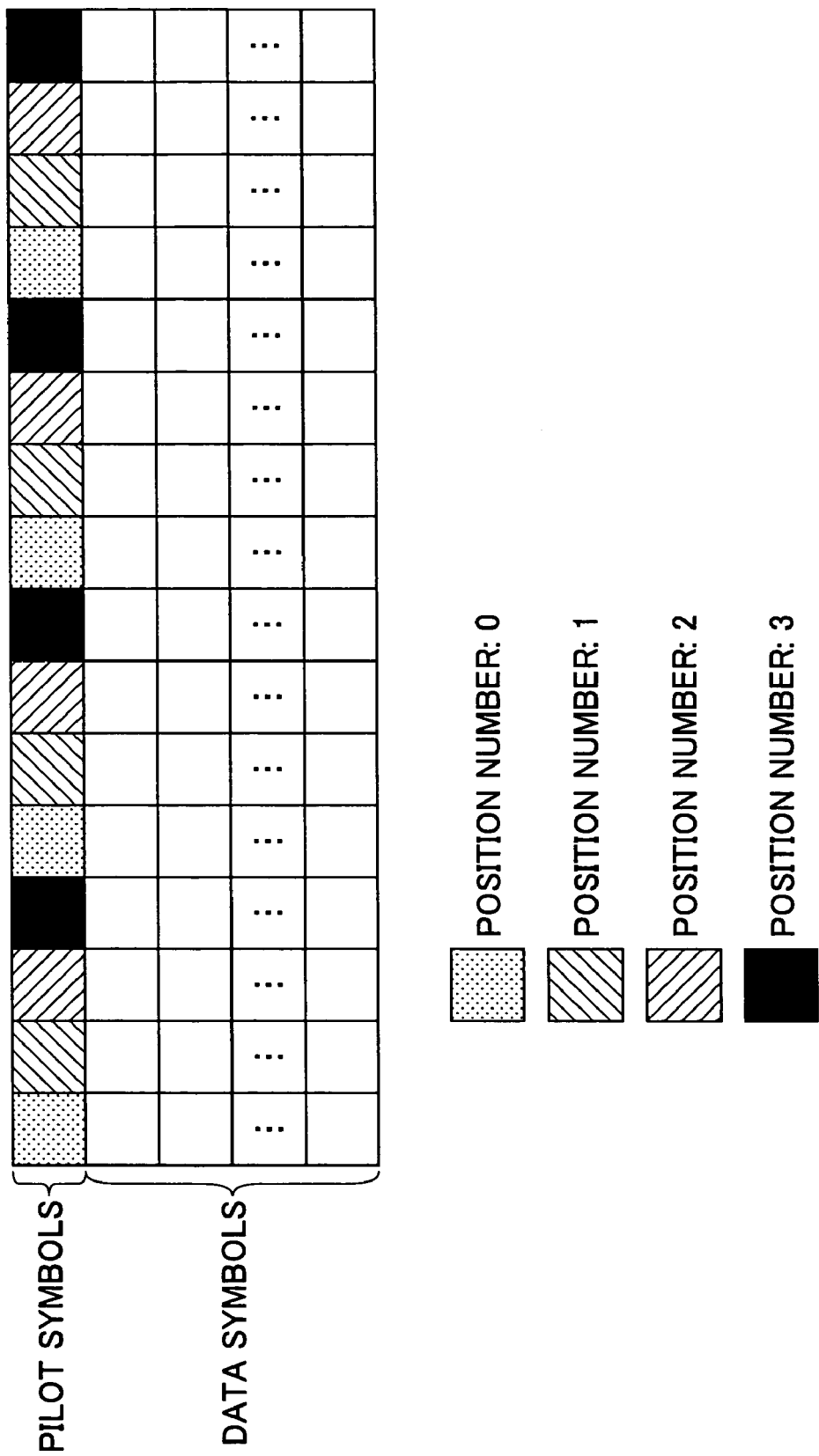
FIG. 33 is an example of resource allocation for pilot symbols.

FIG. 32 illustrates an example of the phase shifting unit 302. The phase shifting unit 302 makes correction to the phase of the IFFT output. The amount of phase correction is expressed as n times p, where n is an integer and $p=2\pi/$ (intervals of pilot symbol insertion). If four pilot symbols are arranged at regular intervals as illustrated in FIG. 32, the number of intervals of pilot symbol insertion becomes 3. The integer n is a number relating to a position of pilot symbol insertion, and it is 0, 1, 2 and 3 in the example shown in FIG. 32. The integer n may take values 0, 1, 2 and 3 in the order of ascending frequencies. In this case, the phase correcting amount n*p becomes 0, $2\pi/3$, $4\pi/3$ and $2\pi$. The phase rotation is carried out only when the FFT points used in the IFFT unit 94 differ from the entire IFFT points, and phase correction is unnecessary if they equal each other. The zero inserting unit 303 corrects an impulse response by inserting "0" in the section in which a path should not exist. The impulse response corrected through phase rotation and time-and-noise-relating corrections is then subjected to fast Fourier transform at FFT unit 304, and finally, a frequency-domain channel estimate for data detection is acquired.

According to this embodiment, the interim result (i.e., the output of the IFFT unit 94) of the timing error detection process is made use of calculation of a channel estimate for data detection. The FFT unit placed before the demultiplexer and the newly added FFT unit 304 can be operated together. Although the correction process is explained only for the desired signal, the same process can be carried out for the undesired signal to acquire a channel estimate.

This patent application is based upon and claims the benefit of the earlier filing date of Japanese Patent Application No. 2005-175781 filed Jun. 15, 2005, the entire contents of which are hereby incorporated by reference.

What is claimed is:

1. An OFDM receiver used in a communication system in which multiple radio communication apparatuses communicate in sync with each other using a same frequency band, comprising:
   an initial timing setting unit configured to define an FFT window for performing fast Fourier transform;
   an FFT unit configured to perform the fast Fourier transform on a received signal; and
   a timing error detection unit configured to determine error information based on a difference between receiving timing of a desired signal from a counterpart transmitter and receiving timing of an undesired signal from a non-counterpart transmitter, the timing error detection unit including
      a pilot signal detection unit configured to detect a pilot signal of the desired signal and a pilot signal of the undesired signal from a signal from the FFT unit;
      a first converting unit configured to convert a frequency-domain channel estimate derived from the pilot signal of the desired signal to a first time-domain channel impulse response;
      a second converting unit configured to convert a frequency-domain channel estimate derived from the pilot signal of the undesired signal to a second time-domain channel impulse response; and
      an error information determination unit configured to determine the error information based on the first and second time-domain channel impulse responses,
   wherein if the frequency band is divided into multiple frequency blocks, each block including one or more subcarriers, the timing error detection unit determines a first receiving timing of the undesired signal using a first frequency block used by the desired signal and a second receiving timing of another undesired signal using a second frequency block not used by the desired signal, and
   the timing error detection unit further includes weighting and combining means for weighting and combining the first and second receiving timings of the undesired signals.

2. The OFDM receiver of claim 1, wherein the timing error detection unit further includes:
   a combination unit configured to combine two or more channel estimates derived from two or more undesired signals into a single combined frequency-domain channel estimate;
   wherein the combined frequency-domain channel estimate is converted to the time-domain channel impulse.

3. The OFDM receiver of claim 1, wherein the second frequency block is a frequency block adjacent to the first frequency block used by the desired signal.

4. The OFDM receiver of claim 1, wherein the initial timing setting unit defines the FFT window such that the FFT window has a starting point after appearance of a maximum-level delayed wave and an end point before termination of a first-arriving wave within the range not beyond the guard interval from the first-arriving wave.

5. The OFDM receiver of claim 1, wherein if different lengths of guard intervals are used for a data symbol and a pilot symbol, the initial timing setting unit defines different FFT windows for the data symbol and the pilot symbol.

6. The OFDM receiver of claim 5, further comprising:
   a timing correction part configured to correct a phase of the impulse response output from the first converting unit according to a position of insertion of the pilot symbol and correct timing of the impulse response according to a time difference between the different FFT windows.

7. The OFDM receiver of claim 1, wherein when two or more frequency blocks are used, the timing error detection unit repeats a resource allocation pattern for a pilot symbol selected for a case in which a single frequency block is used as many times as the number of frequency blocks currently being used.

8. The OFDM receiver of claim 1, further comprising: an IFFT unit configured to perform inverse fast Fourier transform collectively on channel estimates for the two or more frequency blocks; and a timing determination unit configured to determine durations of the converted signals.

9. The OFDM receiver of claim 1, further comprising: an extrapolation unit configured to perform extrapolation on channel estimates for the two or more frequency blocks; and a comparison unit configured to compare the channel estimates before and after the extrapolation.

10. An OFDM receiver comprising: a timing error detection unit configured to determine error information based on a difference between receiving timing of a desired signal from a counterpart transmitter and receiving timing of an undesired signal from a non-counterpart transmitter, the timing error detection unit including: a pilot signal detection unit configured to detect a pilot signal of the desired signal and a pilot signal of the undesired signal from an FFT-processed received signal; a first converting unit configured to convert a frequency domain channel estimate derived from the pilot signal of the desired signal to a first time-domain channel impulse response; a second converting unit configured to convert a frequency-domain channel estimate derived from the pilot signal of the undesired signal to a second time-domain channel impulse response; and an error information determination unit configured to determine the error information based on the first and second time-domain channel impulse responses~wherein if a frequency band is divided into multiple frequency blocks, each block including one or more subcarriers, the timing error detection unit determines a first receiving timing of the undesired signal using a first frequency block used by the desired signal and a second receiving timing of another undesired signal using a second frequency block not used by the desired signal, and the timing error detection unit further includes weighting and combining means for weighting and combining the first and second receiving timings of the undesired signals.

11. A signal receiving method used in an OFDM communication system in which multiple radio communication apparatuses communicate in sync with each other, the method comprising the steps of: receiving a signal at one of the radio communication apparatuses; performing a Fast Fourier transform on the received signal; detecting a pilot symbol of a desired signal and a pilot symbol of an undesired signal contained in the signal that has been Fast Fourier transformed; converting frequency-domain channel estimates derived from the pilots symbols of the desired signal and the undesired signal into first and second time-domain channel impulse responses, respectively; wherein if a frequency band is divided into multiple frequency blocks, each block including one or more subcarriers determining a first receiving timing of the undesired signal using a first frequency block used by the desired signal and a second receiving timing of another undesired signal using a second frequency block not used by the desired signal weighting a power level for receiving timing of the undesired signals from an adjacent subcarrier block using an appropriate weighting factor; determining a receiving timing difference between the desired signal and the undesired signals as error information; and reporting the error information to a counterpart radio communication apparatus currently in communication with said one of the radio communication apparatuses.

* * * * *

UNITED STATES PATENT AND TRADEMARK OFFICE
CERTIFICATE OF CORRECTION

PATENT NO. : 7,672,221 B2 Page 1 of 1
APPLICATION NO. : 11/452412
DATED : March 2, 2010
INVENTOR(S) : Fujii et al.

It is certified that error appears in the above-identified patent and that said Letters Patent is hereby corrected as shown below:

On the title page, Item (75), the Inventors' information is incorrect. Item (75) should read:

-- (75) Inventors: Hiromasa Fujii, Yokosuka (JP); Hitoshi Yoshino, Yokosuka (JP); Takatoshi Sugiyama, Yokohama (JP) --

Signed and Sealed this

Twenty-fifth Day of May, 2010

David J. Kappos
*Director of the United States Patent and Trademark Office*